United States Patent
Chen et al.

(10) Patent No.: US 10,528,356 B2
(45) Date of Patent: Jan. 7, 2020

(54) TIGHTLY COUPLED PROCESSOR ARRAYS USING COARSE GRAINED RECONFIGURABLE ARCHITECTURE WITH ITERATION LEVEL COMMITS

(71) Applicant: International Business Machines Corporation, Armonk, NY (US)

(72) Inventors: Chia-yu Chen, White Plains, NY (US); Kailash Gopalakrishnan, San Jose, CA (US); Jinwook Oh, Edgewater, NJ (US); Lee M. Saltzman, Troy, NY (US); Sunil K. Shukla, Dobbs Ferry, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 14/932,629

(22) Filed: Nov. 4, 2015

(65) Prior Publication Data
US 2017/0123794 A1    May 4, 2017

(51) Int. Cl.
*G06F 9/38* (2018.01)
*G06F 15/78* (2006.01)
(Continued)

(52) U.S. Cl.
CPC .......... *G06F 9/3857* (2013.01); *G06F 9/3012* (2013.01); *G06F 9/30127* (2013.01);
(Continued)

(58) Field of Classification Search
CPC .... G06F 9/3826; G06F 9/3834; G06F 9/3838; G06F 9/3857; G06F 9/3885; G06F 15/7867
See application file for complete search history.

(56) References Cited

U.S. PATENT DOCUMENTS 6,032,252 A    2/2000  Petro et al.
6,615,340 B1 *  9/2003  Wilmot, II ............ G06F 9/3004
                                                         712/209
(Continued)

OTHER PUBLICATIONS

Hammond et al., "Transactional Coherence and Consistency: Simplifying Parallel Hardware and Software", IEEE Computer Society, Nov.-Dec. 2004, pp. 92-103.
(Continued)

*Primary Examiner* — David J. Huisman
(74) *Attorney, Agent, or Firm* — Scully, Scott, Murphy & Presser, P.C.; Daniel Morris, Esq.

(57) ABSTRACT

An apparatus and method for supporting simultaneous multiple iterations (SMI) and iteration level commits (ILC) in a course grained reconfigurable architecture (CGRA). The apparatus includes: Hardware structures that connect all of multiple processing engines (PEs) to a load-store unit (LSU) configured to keep track of which compiled program code iterations have completed, which ones are in flight and which are yet to begin, and a control unit including hardware structures that are used to maintain synchronization and initiate and terminate loops within the PEs. The PEs, LSU and control unit are configured to commit instructions, and save and restore context at loop iteration boundaries. In doing so, the apparatus tracks and buffers state of in-flight iterations, and detects conditions that prevent an iteration from completing. In support of ILC functions, the LSU is iteration aware and includes: iteration-interleaved load-store queue (LSQ) banks; a Bloom Filter for filtering instructions; and a load coalescing buffer.

16 Claims, 18 Drawing Sheets

(51) Int. Cl.
*G06F 9/30* (2018.01)
*G06F 9/32* (2018.01)

(52) U.S. Cl.
CPC ............ *G06F 9/325* (2013.01); *G06F 9/3824* (2013.01); *G06F 9/3828* (2013.01); *G06F 9/3834* (2013.01); *G06F 9/3836* (2013.01); *G06F 9/3838* (2013.01); *G06F 9/3851* (2013.01); *G06F 9/3861* (2013.01); *G06F 9/3889* (2013.01); *G06F 15/7867* (2013.01)

(56) References Cited

U.S. PATENT DOCUMENTS

| | | | |
|---|---|---|---|
| 8,739,141 B2 | 5/2014 | Song et al. | |
| 9,292,284 B2* | 3/2016 | Toi | G06F 9/3001 |
| 9,542,193 B2* | 1/2017 | De Lucas | G06F 9/3834 |
| 10,120,685 B2* | 11/2018 | Chen | G06F 15/7867 |
| 2008/0082738 A1* | 4/2008 | Cypher | G06F 9/3824 |
| | | | 711/108 |
| 2008/0140980 A1* | 6/2008 | Mei | G06F 13/1642 |
| | | | 711/170 |
| 2009/0070552 A1 | 3/2009 | Kanstein et al. | |
| 2013/0246735 A1 | 9/2013 | Park et al. | |
| 2015/0100950 A1* | 4/2015 | Ahn | G06F 8/433 |
| | | | 717/161 |
| 2015/0149747 A1* | 5/2015 | Lee | G06F 9/30065 |
| | | | 712/241 |
| 2016/0019061 A1* | 1/2016 | Chatha | G06F 9/3836 |
| | | | 712/241 |
| 2016/0313991 A1 | 10/2016 | Wei et al. | |
| 2017/0123795 A1* | 5/2017 | Chen | G06F 9/30043 |

OTHER PUBLICATIONS

Zhong et al., "Uncovering Hidden Loop Level Parallelism in Sequential Applications", High Performance Computer Architecture, 2008. HPCA 2008. IEEE 14th International Symposium on, Feb. 16-20, 2008, pp. 290-301.

Hayenga, "Revolver: Processor Architecture for Power Efficient Loop Execution", High Performance Computer Architecture (HPCA), 2014 IEEE 20th International Symposium on, Feb. 15-19, 2014, pp. 1-12.

Schlansker et al., "Parallelization of Control Recurrences for ILP Processors", Compiler and Architecture Research Computer Research Center, HPL-94-75, Aug. 1994, Hewlett Packard, pp. 1-29.

Borin et al., "LAR-CC: Large Atomic Regions with Conditional Commits", Code Generation and Optimization (CGO), 2011 9th Annual IEEE/ACM International Symposium on, Apr. 2-6, 2011, pp. 54-63.

Sankaralingam et al., "Exploiting ILP, TIP, and DLP with the Polymorphous TRIPS Architecture", 2003, Proceedings, 30th Annual International Symposium on Computer Architecture, Jun. 9-11, 2003, pp. 1-12.

* cited by examiner

LSYNC (PPE → ECU) ~ 191
GSYNC (ECU → PPE) ~ 192
LOOPEXIT (PPE → ECU) ~ 193
LOOPCOMPLETE (ECU → PPE) ~ 194
LCRINC (PPE → ECU) ~ 195
CHECKPOINT (ECU → PPE) ~ 196
LOOPPRED (PPE → ECU) ~ 197
GLCR REQ (PE → ECU) ~ 198
GLCR (ECU → PE) ~ 199
START (PPE → ECU) 190A; END (PPE → ECU) 190B; DELTA (PPE → ECU) 190C

325

| DPR | BF | LSQ | Cache (L1) | Response |
|---|---|---|---|---|
| 300 ~ Hit | X | X | X | Defer load until all prior instructions are installed ~ 331 |
| 335 ~ Miss | Hit | Hit (FM) ~ 340 | X 344 | Forward data from LSQ to PPE ~ 341 |
| 336 ~ Miss | Hit | Hit (PM) ⎫ 342 | Hit ⎭ | Merge data for Cache and LSQ and return to PPE ~ 345 |
| 337 ~ Miss | Hit | Hit (PM) | Miss | Forward data from L2 and merge it with LSQ ~ 346 |
| | Miss | X | Hit | Forward data from L1 Cache ~ 347 |
| | Miss | X | Miss | Forward data from L2 Cache ~ 348 |

FM: Full Match, PM: Partial Match

FIG. 7

LD/ST REQ (PPE → LSU) 133;
ST DATA (PPE → LSU) 134;
LD DATA (LSU → PPE) 136;
LD/ST ADDRESS (PPE → LSU) 137;
LSID (PPE → LSU) 138;
ITERATION ID (PPE → LSU) 139

FIG. 10A

COMMIT REQ (ECU → LSU) 143;
COMMIT DONE (LSU → ECU) 144;
EXCEPTION (LSU → ECU) 147;
EXCEPTION ITERATION ID (LSU → ECU) 148

MVGLOOP Instructions (GLCR)

910 — LD8U, F1MUL
912 — F1MUL
F1CMPGT
LD8U, F1MUL (Predicated)

LD8U, F1MUL (Predicated)
FUSION, F1ADD

LD8U, F1ADD, ST8U

F1SQRT, ST8U ~ 915

```
for (i=10; i < 1000; i += 10)
{
    x = a[i] * k;
    y = x * 2;
    if (y > 0)
        z = c[i] * y;
    else
        z = d[i] * y;
    t = t + z;
    e[i] += t;
    f[i] = sqrt[t];
}
```

ALU TYPE 512

ALU (TYPE = 0) REGISTER - REGISTER OPS — 502

| 0-TYPE | OPCODE 1 TO 8 | INPUT_0 9 TO 13 | INPUT_1 14 TO 18 | INPUT_2 19 TO 23 | BITSELECTION / FUSION 24 TO 33 | PREDICATE INPUT 34 TO 39 | MISC 40 TO 45 | LRFTAG 46 TO 50 | OUTPUT 51 TO 59 | C - 60 TO 63 |

ALU (TYPE = 0) REGISTER - IMMEDIATE OPS

| 0-TYPE | OPCODE 1 TO 8 | INPUT_0 9 TO 13 | IMMEDIATE (20-BIT SIGNED IMMEDIATE) 14 TO 33 | PREDICATE INPUT 34 TO 39 | MISC 40 TO 45 | LRFTAG 46 TO 50 | OUTPUT 51 TO 59 | C - 60 TO 63 |

LSU (TYPE = 1) REGISTER - REGISTER OPS - LOAD (2 REGS) — 504

| 1-TYPE | OPCODE 1 TO 8 | INPUT_0 9 TO 13 | INPUT_1 14 TO 18 | MISC 19 TO 23 | NOT IN USE 24 TO 33 = 0b0 | PREDICATE INPUT 34 TO 39 | LSUID 40 TO 45 | LRFTAG 46 TO 50 | OUTPUT 51 TO 59 | C - 60 TO 63 |

LSU (TYPE = 1) REGISTER - IMMEDIATE OPS - LOAD (1 REG + 1 Imm)

| 1-TYPE | OPCODE 1 TO 8 | INPUT_0 9 TO 13 | MISC 14 TO 18 | IMMEDIATE (14-BIT IMMEDIATE) 19 TO 32 (BIT 33 = 1) | PREDICATE INPUT 34 TO 39 | LSUID 40 TO 45 | LRFTAG 46 TO 50 | OUTPUT 51 TO 59 | C - 60 TO 63 |

LSU (TYPE = 1) REGISTER - REGISTER OPS - STORE (3 REGS) — 506

| 1-TYPE | OPCODE 1 TO 8 | INPUT_0 9 TO 13 | INPUT_1 14 TO 18 | INPUT_2 19 TO 23 | NOT IN USE 24 TO 33 = 0b0 | PREDICATE INPUT 34 TO 39 | LSUID 40 TO 45 | NOT IN USE 46 TO 50 | MISC 51 TO 59 | C - 60 TO 63 |

LSU (TYPE = 1) REGISTER - IMMEDIATE OPS - STORE (2 REGS + 1 Imm)

| 1-TYPE | OPCODE 1 TO 8 | INPUT_0 9 TO 13 | INPUT_1 14 TO 18 | IMMEDIATE (14-BIT IMMEDIATE) 19 TO 32 (BIT 33 = 1) | PREDICATE INPUT 34 TO 39 | LSUID 40 TO 45 | NOT IN USE 46 TO 50 | MISC 51 TO 59 | C - 60 TO 63 |

510, 515, 520, 525, 530

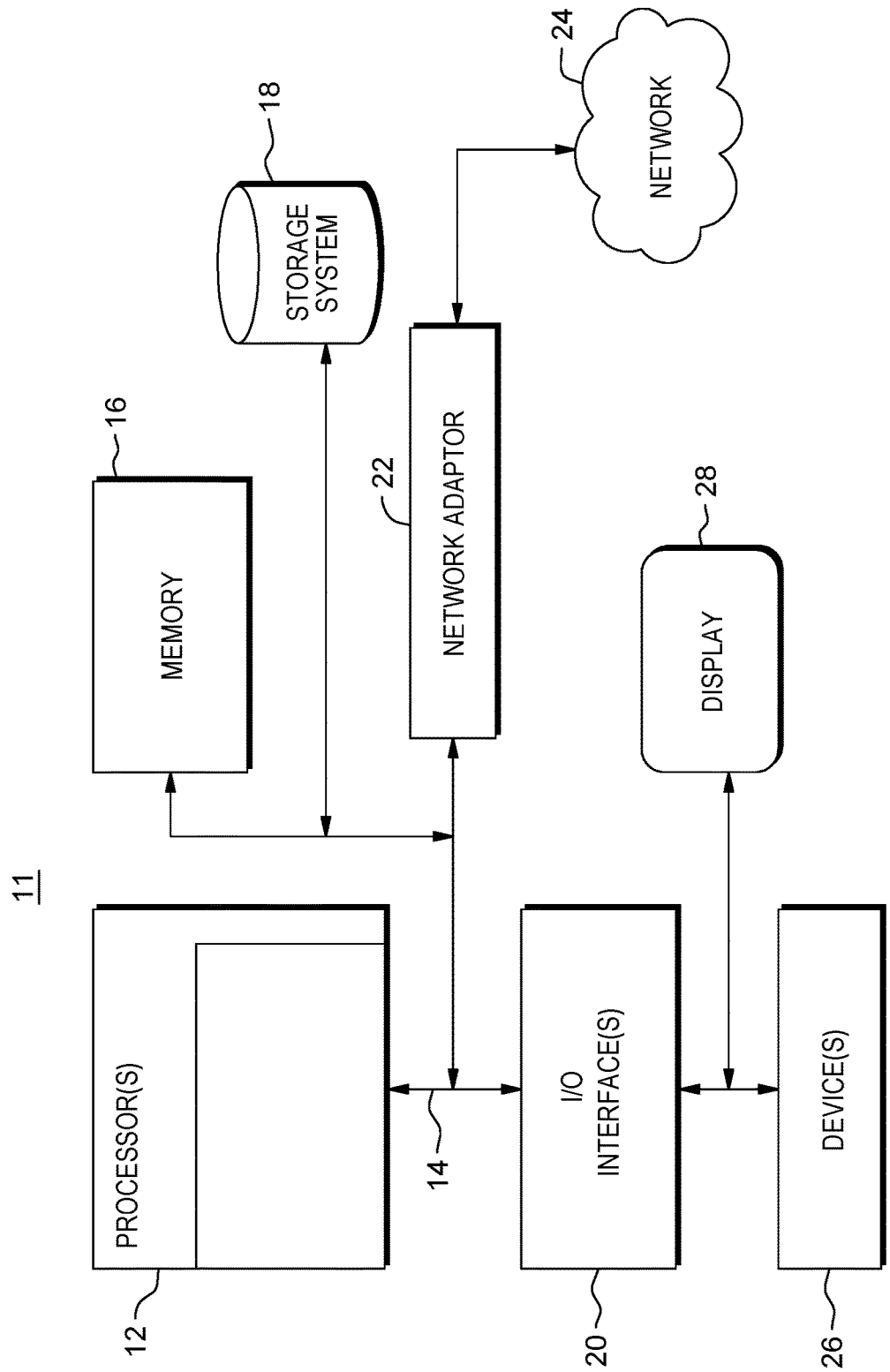

TIGHTLY COUPLED PROCESSOR ARRAYS USING COARSE GRAINED RECONFIGURABLE ARCHITECTURE WITH ITERATION LEVEL COMMITS

FIELD

The present invention relates to computer system architectures, and particularly a course grained reconfigurable architecture that provides for simultaneous multiple iterations (SMI) and iteration level commits (ILC).

BACKGROUND

Course grained reconfigurable architectures (CGRA) in computer systems have been available. As known, a CGRA is an array of light weight functional units called processing elements (PEs) which are interconnected with each other via some sort of interconnect network (mesh, hypercube, star, NoC, . . . ). The dataflow architecture of the CGRAs make then very well suited for accelerating (innermost) loops because they can very effectively utilize spatial and temporal parallelism often found in such loops.

The coarse grain datapath, rich point-to-point interconnects and abundant, albeit distributed register files make them very competitive when compared to other accelerator architectures (VLIW, FPGA, and GPU). For example, with respect to data-parallel vs. non-data parallel performance, comparing CGRA's to GPU's it is noted that GPUs can only accelerate data-parallel loops (exploiting DLP (data level parallelism) and TLP (thread level parallelism)) while CGRAs can exploit DLP, TLP and instruction level parallelism ILP (across loop iterations) to even accelerate loops that have no data parallelism.

With respect to a programming model, since GPUs can only exploit DLP and TLP, this implies that significant code rewrite may be needed in order to accelerate the application on a GPU—incurring significant software development and debug costs. For a CGRA, it is possible to simply annotate portions of the application and the compiler then maps the application without having to rewrite the code.

Further, in order to get significant application performance gains on a GPU, the loop trip count needs to exceed 10000 or so. In a CGRA, the loop trip count can be as low as 100 for the application to be accelerated.

Finally, GPUs can only accelerate loops where the trip count is known in advance of loop execution. However CGRAs can accelerate loops that have data dependent exit conditions (while, break, continue).

However, there are limitations and challenges in CGRA implementations: Often CGRAs are studied without a realistic load-store unit (LSU) which in reality has a significant effect on performance. This is especially important if CGRAs are to be considered in the context of a cache coherent accelerator. CGRAs, unlike GPUs which employ the warping concept, have no mechanism for hiding the memory latency. Hence data cache misses can impose severe performance penalty. Further, CGRA architectures do not provide a mechanism for checkpoint, recovery and rollback.

Current CGRA architectures do not provide support for loop-related hardware features such as ability to exit based on data-dependent condition, breaks, etc. Moreover, with respect to loop-related hardware features, in a CGRA, loop execution acceleration is achieved through compiler-assisted placement of loop instructions onto an array of processing engines (PEs/ALUs). This is referred to as a "Static Placement" distinguishing it from "Dynamic Placement" which is typically employed at run-time and is very common in Out-Of-Order processors.

For CGRAs with a large number of PEs, it is desirable to have a very high degree of instruction-level parallelism (ILP) to keep the PE's occupied.

Traditionally, this ILP is achieved by compiler-mediated placement of instructions (from other loop iterations)—also commonly referred to as Modulo Scheduling.

However, traditional Modulo Scheduling has many disadvantages. For example, although Modulo Scheduling helps keep the PE's occupied, one disadvantage is: 1) that Compiler assumed latencies (for modulo scheduling) often differ from runtime latencies due to the unpredictable nature of load and store instructions in CMPs (shared memory systems). This makes runtime performance suboptimal; 2) For loops that have loop-carried memory dependencies, it is possible to have store-hit-load (LSU) violations across loop iterations. This will cause a later iteration to be flushed and subsequently re-executed. Since instructions from these iterations are intermingled with each other, this imposes additional complexity on the predecoder/execution engine to selectively replay only the flushed iteration; and 3) the degree of modulo scheduling (=the number of loop iterations in flight) is decided at compile time. However, it may be optimal at run-time to choose fewer loop iterations in flight due to dependency or other constraints.

SUMMARY

A novel CGRA and methods that overcome the limitations of conventional architectures (including CPUs and GPUs).

A novel CGRA which employs two novel execution paradigms: Simultaneous Multiple Iterations (SMI) and Iteration Level Commits (ILC).

According to a further aspect of the present invention, there is provided an apparatus comprising: a plurality of processing elements (PE), each element employing hardware providing a runtime mechanism for executing program code instructions including a loop, each PE running multiple concurrent iterations of the same loop; a load and storage unit (LSU) including multiple banks of load storage queues (LSQ) for storing load instructions and store instructions associated with the multiple concurrent iterations and enabling completion of iterations in order; and an execution control unit (ECU) for synchronizing operations performed at each the PE and the LSU including tracking of the iterations that have completed, which iterations are already running, and which iterations are yet to begin, the ECU for communicating signals to and receiving signals from each PE and LSU to synchronize initiating and completing of the multiple concurrent iterations on all or a sub-set of the plurality of PEs, such that all instructions are committed at loop iteration boundaries.

According to a further aspect, there is provided a method for running multiple simultaneous instructions in a course grained reconfigurable architecture having a plurality of processing elements (PEs), the method comprising: providing, at each PE, a runtime mechanism for executing program code instructions including a loop, each PE running multiple concurrent iterations of the same loop; storing, at a load and storage unit (LSU) having multiple banks of load storage queues (LSQ), load instructions and store instructions associated with the multiple concurrent iterations and enabling completion of iterations in order; and synchronizing, at an execution control unit (ECU), operations performed at each the PE and the LSU including tracking of the iterations that have completed, which iterations are already running, and which iterations are yet to begin, the synchronizing including communicating signals from the ECU to and receiving signals from each PE and LSU for initiating and completing of the multiple concurrent iterations on all or a sub-set of the plurality of PEs, such that all instructions are committed at loop iteration boundaries.

BRIEF DESCRIPTION OF THE DRAWINGS

FIG. 7 shows an example Table that summarizes the possible LD execution scenarios in the LSQ;

FIG. 10A shows signals communicated between the LSU hardware component and a PPE;

FIG. 10B shows signals communicated between control hardware component for synchronizing and tracking and the LSU;

FIG. 14A depicts a high-level code representation of an example program portion including an iterative loop to be run on a computer system;

FIG. 14B is a compiled machine language code corresponding to the iterative FOR loop code portion of FIG. 14A;

FIG. 15 shows various example instruction types that are decoded and "executed" in the PPEs;

FIG. 18 shows exemplary hardware components of a computer according to an embodiment of the present invention.

DETAILED DESCRIPTION OF THE PREFERRED EMBODIMENTS

Embodiments of the present invention will now be described in detail on the basis of the drawings. However, the following embodiments do not restrict the invention claimed in the claims. Moreover, all combinations of features described in the embodiments are not necessarily mandatory for the architecture of the present invention. The same numbers are assigned to the same components throughout the description of the embodiments of the present invention.

Embodiments of the present invention provide a novel CGRA architecture that accelerates processing of program loops and is configured to perform simultaneous multiple iterations (SMI) by providing a hardware runtime mechanism (that is local to a processing engine or PE) to execute instructions from multiple iterations as determined from a compiled program.

Embodiments of the present invention additionally provide a novel CGRA architecture that accelerates processing of program iteration loops and is configured to perform iteration level commits (ILC). That is, in CGRAs with dynamic issue, each processing element (a processing engine, PE) can execute its next available instruction (whenever its operands become ready and independent of other PEs).

Figure 1:
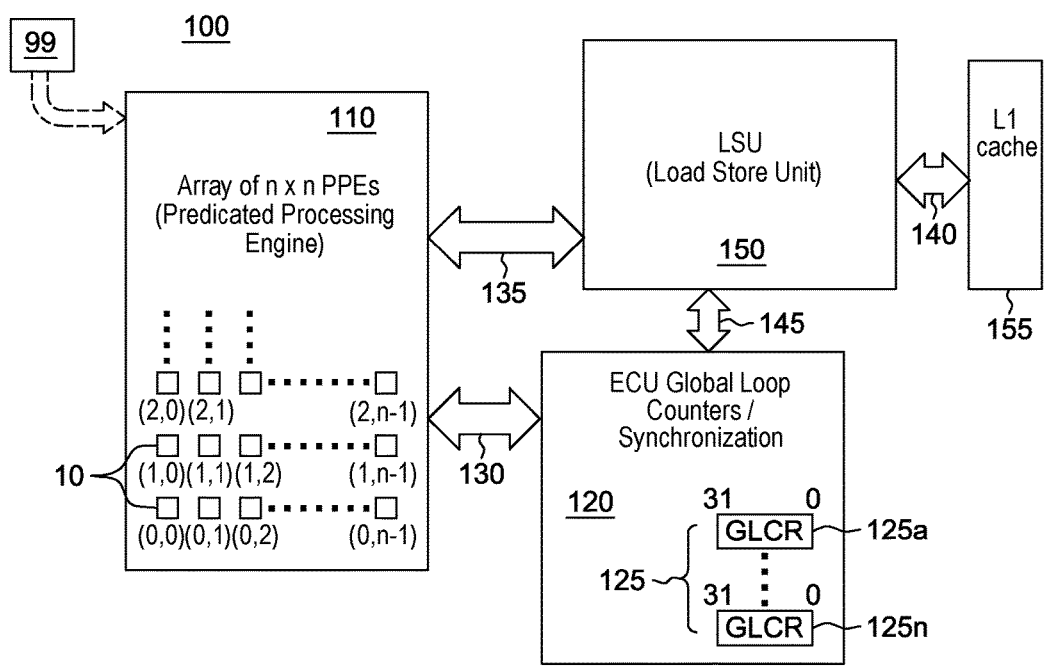
FIG. 1 shows exemplary functional hardware components of a Coarse Grain Reconfigurable Architecture (CGRA) system 100 according to an embodiment.

FIG. 1 shows exemplary functional hardware components of a CGRA system 100 according to an embodiment. The components making up CGRA system 100 may be implemented on a hardware platform such as in an Application Specific Integrated Circuit (ASIC) or a reconfigurable hardware platform such as Field Programmable Gate arrays (FGPA). The components include the array 110 of processing elements 10, one or more or all of the processing elements 10 being a PPE (Predicated Processing Engine) that is responsible for instruction decode operations and execution as well as sending/receiving data/addresses to other PEs 10 as well as to an "Iteration-Aware" Load-Store Unit (LSU) 150 that perform load/store operations on a memory (e.g., an L1 D-cache) 155.

The PPE 10 generally includes at least an arithmetic logic unit (ALU) and is responsible for Address-Generation for the Load and Store operations of the LSU 150. Every PPE 10 in the system is connected to the LSU 150 through individual buses 135 to exchange load-store related data and metadata. An L1 level cache 155 or lower cache stores results committed as a result of completing a particular iteration. The committed data resulting from iteration completion are communicated to/from the LSU via data/address lines 140. The CGRA 100 is configurable to use all or any subset of the PPEs 10 to run instructions at any one time. Each or a subset of the PPEs 10 are also connected to an execution control unit (ECU) 120.

The ECU 120 includes hardware for synchronizing operations performed at each said processing element and the LSU 150 including tracking of iterations that have completed, which iterations are already running, and which iterations are yet to begin. In one embodiment, in support of ILC functionality, the Load Store Unit 150 is configured to support many concurrent loop iterations (e.g., by implementing an Iteration interleaved Load Store Queue (LSQ) microarchitecture, LSQ size, ports etc.), use of a Bloom Filter; use of a Load Coalescing Buffer, and an ability to support failure, checkpoint, recovery and rollback operations in the LSU.

In one embodiment, the execution control unit 120 includes a Global Loop Counter Register (e.g., 32 bit) which is used to maintain values of loop (iteration) counts (start, end, and deltas), and used for synchronization prior to entering a new loop nest and after exiting; and for data dependent loop exits. The Global Loop Counter Registers (GLCR) 125a-125n and related hardware (HW) structures of execution unit 120 are connected to all the PPEs 10 via data bus and signal lines 130. The GLCR structures/handshakes/hardware support SMI and ILC operations and further are used in support of failure, checkpoint and recovery operations.

Further, GLCRs 125 and related HW structures of the ECU 120 are connected to the Load-Store Unit (LSU) 150 via data bus and signal lines 145 for keeping track of which iterations have completed, which ones are in flight and which are yet to begin. The LSU 150 and GLCRs 125 are shared global structures. Additionally, the Global Loop Counter and related HW structures of execution unit 120 include a centralized point of the signals needed for loop initiation, completion and for checkpoint, recovery and rollback operations.

Generally, in system 100, to support SMI and ILC functional operations, the plurality of PPEs 10 of FIG. 1 are organized according to an N×N topology, e.g., of 64-bit PPEs—with 8NN (8-nearest neighbor) network connectivity.

Figure 2:
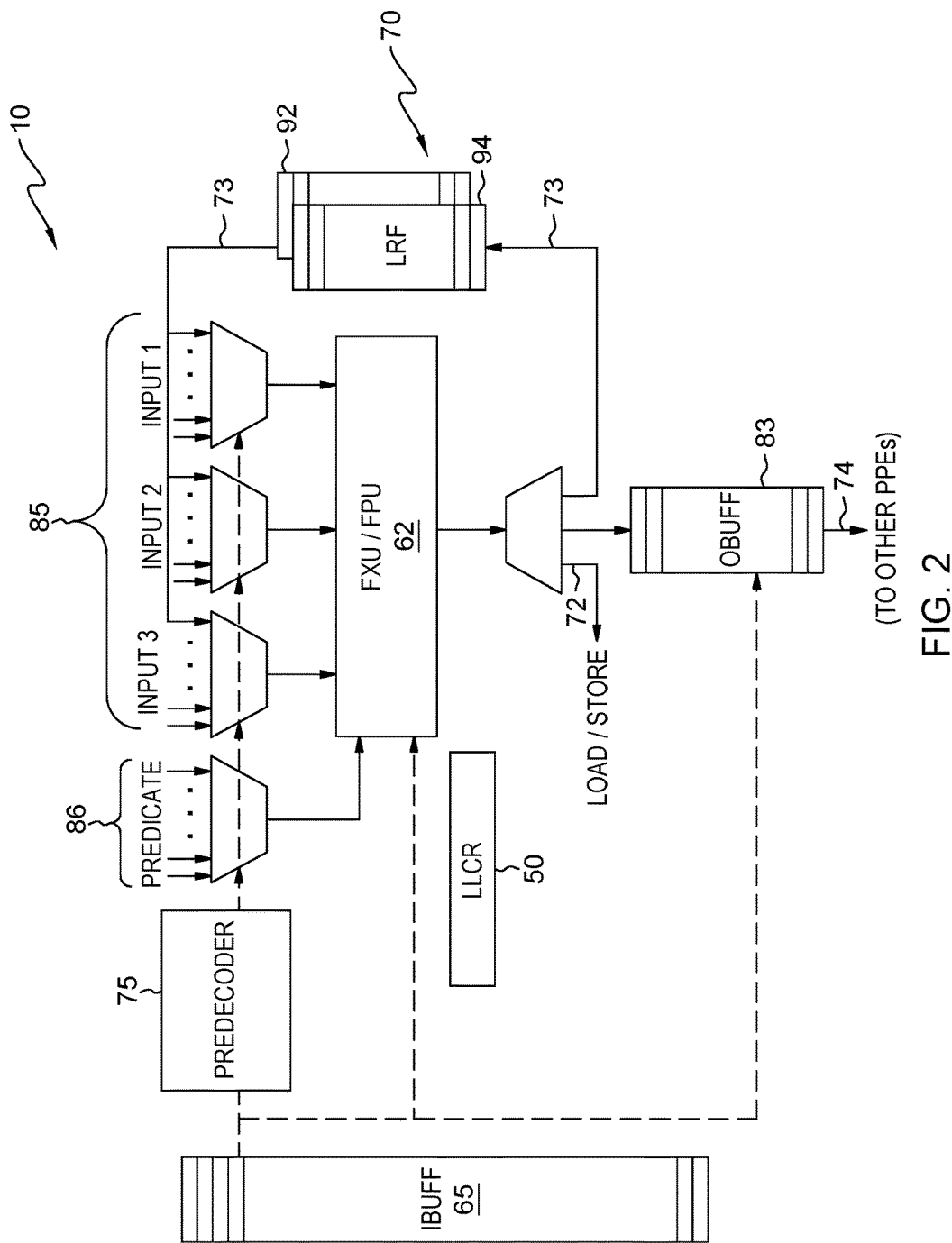
FIG. 2 shows a processing engine (PE) in a Coarse Grain Reconfigurable Architecture GGRA 100 according to one embodiment.

FIG. 2 shows a more detailed view of a predicated processing engine building block 10 of the CGRA 100 for supporting SMI and ILC functionality. Each PPE 10 is responsible for instruction decode and execution as well as sending/receiving data/addresses to other PEs 10 as well as to the load-store unit (LSU) 150.

Each PE 10 includes the following subcomponents: the ALU 62 having a fixed point unit (FXU) and floating point unit (FPU), for handling fixed point and floating point operations. In one embodiment, different PEs within a CGRA might have different supported functions (and instructions); an Instruction-Buffer (IBUFF) 65 to hold instructions for execution; different types of register files 70 to support multiple concurrent iterations and which registers are separated between intra iteration vs. inter-iteration; and a Predecoder 75 that is responsible for predecoding the next instruction in the instruction buffer. Further but not shown are a plurality of Hardware (HW) structures for sending data to other PEs along paths 74, and to the LSU along paths 72. Data is received from other PE's along paths 85 and each PE receives data from itself via internal paths 73. Further included are hardware (HW) structures (not shown) for forwarding the data received from other PEs and the LSU to an operand buffer 83 and to pick the lowest available iteration for execution; and structures that communicate with the Global Loop Counter (GLCR) 125 and the hardware structures that maintain state at the execution unit 120.

In one embodiment, the IBUFF 65 is loaded up prior to program execution from the L1 I-Cache/L2 and the instructions are re-used as the program executes loop iterations.

In one embodiment, an independent program counter (not shown) associated with each iteration indexes into the shared instruction buffer (IBUFF) register contents.

Further, the Decoder/Pre-decoder element 75 analyzes the "next" instruction in the instruction stream (e.g., ALU operation vs. Load request vs. Store request). It analyzes Metadata information (Branch-begin, Branch-End, Synchronization, Loop exit, etc.) and also sends out input requests (depending on the instruction-type and the input operand number).

Further, as shown in FIG. 2, included in each PPE element 10 is a Local Loop Counter Register (LLCR) 50 which may, for example, start at 0 and count up (e.g., incrementing by 1 for each local loop iteration). The LLCR counter 50 is a counter local to and maintained by the PPE 10 for maintaining an iteration count inside the PPE. However, it is only used when the loop trip starts from 0 and increments by 1. In all other loops, a GLCR value obtained from counter 125 in the ECU is used. For example, given start, end and delta values of a simple loop, LLCR counter 50 local to the PPE will maintain the iteration count. In embodiments described herein, a PPE may run a different instruction associated with a different iteration at any one time.

As further shown in FIG. 2, the Register Files 70, in one embodiment, are private to each PPE 10 (i.e., not shared). In an embodiment, two classes of logical register files are provided: Output Register Files (ORF or OREG) 92 for operands and results that are strictly consumed within the iteration; and Local Register Files (LRF) 94 for results that are consumed across iterations. These two classes of logical register files could share the same physical register file.

In particular, register files 70 within PPEs 10 are used to store temporary information (results/outputs of instructions) that could be utilized by a different instruction on either the same or a different PPE.

Further, in one embodiment, each predicated processing engine (PPE) 10 provides full Predication Support, i.e., every instruction has predication support to indicate whether the instruction is on a true-path or a false-path. This adds 6-bits to the ISA instruction (true/false+5-bit regular input). A predication input 86 is often the result of a compare instruction and is treated similar to regular inputs. An instruction with no predicate input is treated similar to a true-path predicated instruction. A false-path predicated instruction is not issued to the functional unit. Instead, an all zero result is pushed into the output register slot corresponding to that instruction. This saves expensive compute time and results in performance improvement and energy saving. A compiler provides an if-conversion to convert control dependence to data dependence. This is especially needed for CGRA since it is a data-flow architecture.

In a further embodiment, the PE 10 may optionally be configured to support Bitselection/Fusion. Bitselection is used with 2-input ALU Reg-Reg instructions—to select a subset of bits from 1 of the inputs and then to be combined (ALU Opcode) with the $2^{nd}$ input (for example: A+(B>>15)). Fusion operation is used with 2-input ALU Reg-Reg Instructions to select the correct input when a register comes from 2 predicated paths for example: A+(B1:B2) where B1,B2 come from opp. predications. Fusion and Bitselection are mutually exclusive—i.e. cannot be used simultaneously.

In depicting an example of loop acceleration SMI and ILC operations in system 100, reference is made to FIG. 14A which depicts a high-level code representation of an example program portion including an iterative loop to be run on a computer system. In one embodiment, a whole compiled program comprising of several instructions is mapped on one of the PEs satisfying their dependency. This mapping is done in compiler's backend scheduler, which consider instructions' dependence, interconnection's constrains, and performance optimization to map instructions to PPEs 10.

The program code section includes a simple FOR loop processing 900 that initially starts from an index i=10 (START) to 1000 (END), e.g., and that increments by values of i by 10 (DELTA is 10). The loop includes instructions to compute values of an array f[i], which is computed based on intermediate computations of variables, x, y, z, t and computed intermediate array values c[i], d[i] and e[i].

FIG. 14B is a compiled machine language code 901 corresponding to the FOR loop code portion 900 of FIG. 14A. Here, a compiler generates the machine-level instructions 901 corresponding to the high level instructions of the algorithm including loop 900 shown in FIG. 14A.

Figure 14C:
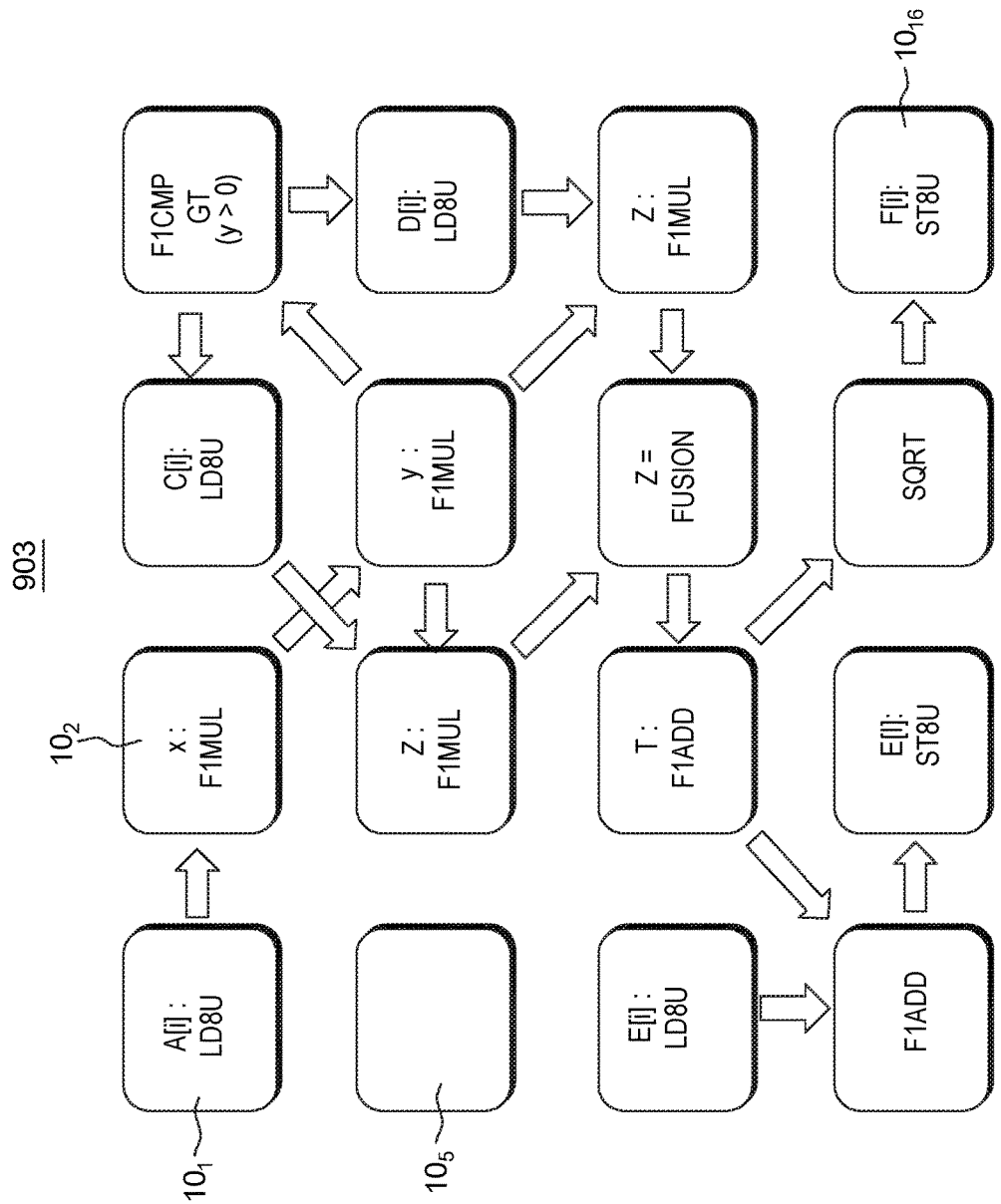
FIG. 14C shows an example compiler mapping and scheduling the individual compiler instructions to a corresponding PPE from among 16 different PPEs in one embodiment.

In accordance with one embodiment, a compiler 99 shown in FIG. 1 intelligently distributes (divides and places) the instructions between the PPEs while respecting data-dependency constraints and other scheduling constraints and optimizations. The compiler distributes the corresponding 64-bit machine language code instructions 901 on a plurality of PEs, each PPE receiving the instruction(s) from the compiler that only that PPE can access and execute. As shown in FIG. 14C, the compiler transforms an instruction stream (e.g., transforms the stream) to enable predication (e.g., if—conversion, loop predication) and maps and schedules 903 the individual compiler instructions 901 to a corresponding PPE from among 16 different PPEs $10_1, \ldots, 10_{15}, 10_{16}$. For example, the load initial value machine instruction 910 shown in the processing loop of FIG. 14B is mapped to PPE $10_1$ shown in FIG. 14C to run the corresponding load instruction "LD8U" placed in its IBUFF. This load instruction is to obtain a data value of a[i] from the LSU and pass this data 905 to the next PPE $10_2$ to perform the next operation placed in its IBUFF. Thus, the multiplication operation machine instruction 912 shown in the processing loop of FIG. 14B is mapped to PPE $10_2$ shown in FIG. 14C to perform on its ALU the corresponding multiplication instruction "F1MUL" involving a variable x. This mapping process for distributing each loop instruction 901 on the PPEs continues, for example, until, for example, a final Store machine instruction 915 shown in the processing loop of FIG. 14B is mapped to PPE $10_{16}$ shown in FIG. 14C to perform the corresponding store operation "ST8U" placed in its IBUFF. This instruction is for storing the data result value f[i], e.g., to the LSU or L1/L2 cache. In this last instruction, a final bit field of the instruction may be set to indicate to the PPE that the last instruction of the loop iteration is being run (signifying an operation performed at that PPE has ended).

For PPE $10_5$ in which no operation is being performed, a corresponding NOP instruction may be placed in its IBUFF.

In one embodiment, the compiler 99 determines which instruction will go to which PPE and distributes the instructions on the different PPEs, with decisions made as to which PPE to pass a result or data to made at compile time. The compiler encodes as part of the instruction an instruction type, where the inputs are coming from in the system, and to where to pass a result or data to in the system.

FIG. 15 shows various example instruction types 500 that are decoded and "executed" in the PPEs 10. In one embodiment, instruction types 502, 504, 506 includes fields for indicating to a PPE a type of operation (e.g., ALU, Load, Store), where inputs are coming from (e.g., a source such as a register file, or LSU) and where data or results are to be passed to (e.g., register file or LSU). For example, instructions 502 are 64-bit ISA instruction set architecture instructions for running ALU-type logical or computation register-register operations (Ops) or ALU-type register-immediate Ops (ALU instructions). Here, such instructions are processed by obtaining the data from producer PPEs, performing the logical or arithmetic computation, and send the result data to the consumer PPE; Instructions 504 are 64 bit instructions for running LSU-type register-register operations (Ops) for LOAD operation or register-immediate Ops—LOAD. Instructions 506 are 64 bit instructions for running LSU-type register-register operations (Ops) for STORE operation or register-immediate Ops—STORE. Here, such LD/ST instructions are processed by accessing the partitioned LSQ in LSU 150 or a memory.

As an example, in ALU ops 502, the OPCODE field 510 is a code of the type of operation, e.g., multiply, add, etc., input 0, input 1 and input 2 are three inputs 512 (and a predicate input 515) and may come from a different PPE (e.g., neighbor) or a data result from itself, e.g., a computation result stored from a prior clock cycle. For example, one input may be stored in and come from a register file local to that PPE. One field is the LRFTAG field 520 informing a PPE as to which LRF slot (a determined unique address space) an Ops result is to be placed (a 5-bit field providing up to 32 slots). A further output field 525 is a 9-bit field mask specifying where a result is to be passed, e.g., with 8 bits identifying a neighboring PPE (where the result is going to) and a single bit indicating itself (Self-PPE). A further field 530, includes a SYNC bit therein which bit is to be set to indicate that to the PPE that that instruction is the last instruction to be performed in the loop and that it will be exiting.

In one embodiment, with reference to FIG. 14C, once an instruction has finished executing at a PPE, e.g., $10_1, \ldots, 10_{15}, 10_{16}$, i.e., once a SYNC bit in field 530 is set to indicate the last instruction, the PPE will issue the LCRINC signal 195 indicating to the ECU that that the instruction at that PPE has completed. Different instructions can have different latencies and dependencies and can report an LCRINC signal to the EC U at different times. Once all the PPEs send this LCRINC signal 195 to the ECU the GLCR counter 125 will increment by the DELTA value.

One goal of the system infrastructure 100 of FIG. 1 is to increase instruction- and loop-level parallelism (ILP) by concurrently executing multiple loop iterations but by not employing Modulo Scheduling. That is, CGRA 100 configured to perform SMI, the instructions from concurrent iterations are not overlapped (as in the modulo-scheduling case) in the program, but instead, only instructions from one (1) iteration sit within an IBUFF within a PPE. In this configuration, each PPE runs multiple iterations of the same loop, e.g., time multiplexed (to increase ILP and hide the memory latency). The system 100 permits a sharing of the IBuff entries in the PPEs between different iterations—each iteration (in each PPE) with its own program counter PC.

Thus, in support of SMI functionality, each PPE 10 includes: 1) hardware for executing logic to pick the lowest iteration that is ready for execution; 2) all local, output and global register files that are partitioned by iteration; 3) an ability to perform checkpoint, recovery and rollback operations in each PPE; and 4) the shared instruction buffer (IBUFF) having an independent program counter for each iteration.

The hardware supports a certain maximum number of iterations in flight (which is a function of loop attributes and other hardware resources including register files and load-store queue sizes). Each iteration has its own program counter (PC) that indexes into the common IBUFF.

SMI allows execution of the next instruction within any iteration (in flight) if it has finished pre-decoding.

In one embodiment, a "lowest" iteration number (oldest iteration) gets highest priority for decode/execution. Thus, if instructions from multiple iterations are ready for execution (i.e., they have all been pre-decoded and the register inputs for these instructions have been procured and placed in the operand buffers), then the HW picks the instruction associated with the lowest iteration number ready for execution.

If in a particular clock cycle, a loop iteration with a lower iteration number is stalled (e.g., while it is waiting for data), the HW will automatically execute the instruction from the next higher iteration number that is ready, i.e., that has all the data available for execution.

By allowing multiple simultaneous iterations in flight and by picking the iteration that is ready for execution at run-time, the SMI operations automatically allows the CGRA 100 to have high ILP by overlapping concurrent loop iterations.

Figure 17:
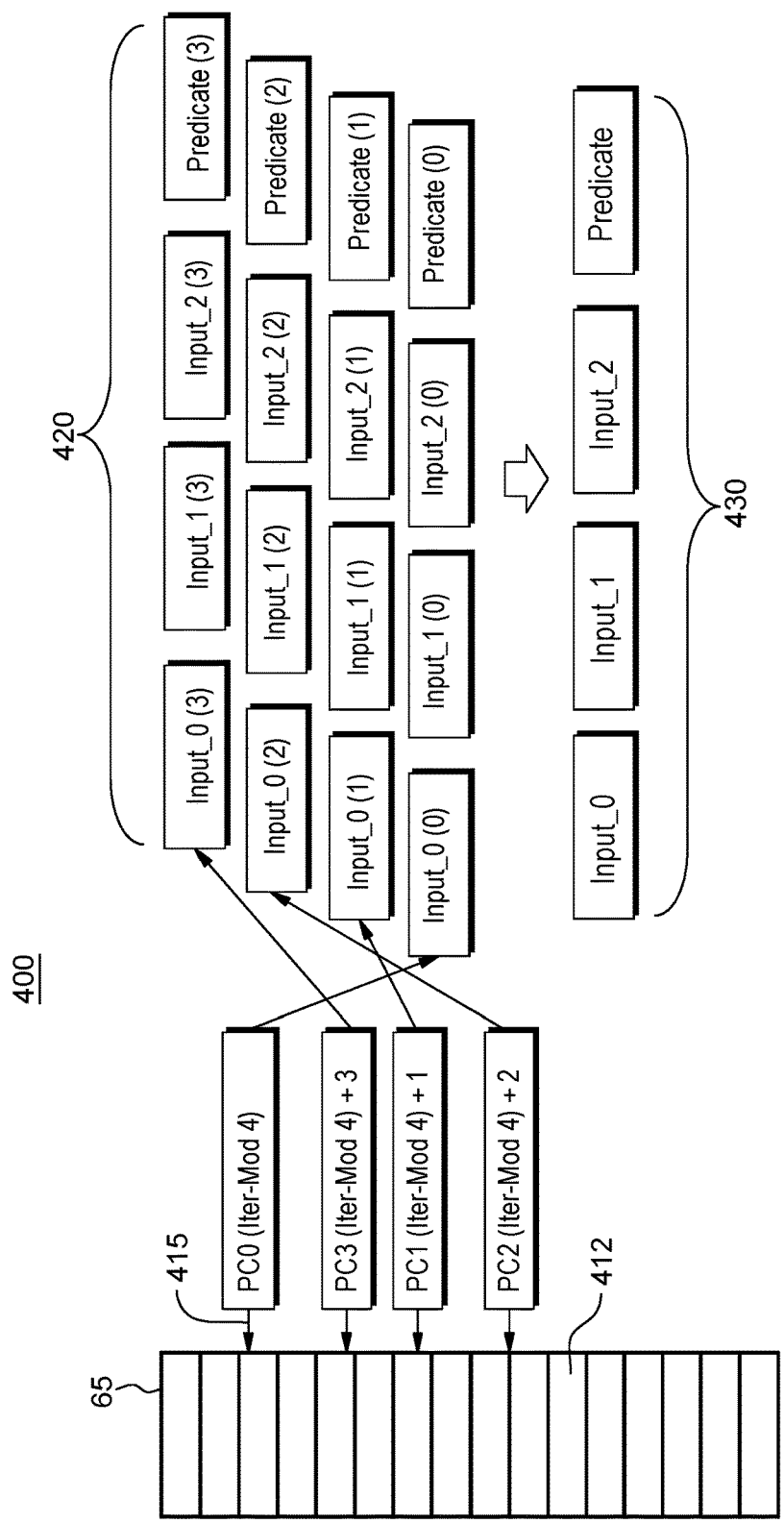
FIG. 17 depicts simultaneous multiple iteration support in the system of FIG. 1.

FIG. 17 depicts simultaneous multiple iteration support 400 in the system of FIG. 1. To support SMI, each iteration has its own PC 415 and operand-buffer. In one embodiment, the PC's for different iterations, here iterations labeled (0) through (4), share the IBUFF 65 having slots 412 associated with the PPE. Further, at the beginning of a decoding cycle, the earliest available iteration (with an empty operand buffer) is picked for decoding, e.g., a highest priority for lowest iterations. At the end of every cycle, the lowest available iteration with all ready inputs stored in the operand buffers 420 are copied into the execution buffer 430, e.g., again a highest priority for lowest iterations. Near the end of every cycle, if all "ready flags" for each operand buffer are set to "1" for example (when requested, a ready flag is set to 0; when the data becomes available and is placed in the operand buffer, the ready flag is then set to 1), then the operands are copied from the operand buffer 420 to the execution buffer 430 for execution in the following cycle. This frees up the operand buffers 420 for the decode of the next instruction in the following cycle.

This movement of data to the execution buffer 430 triggers execution in the following cycle.

Thus, an earliest time an instruction can execute is 1 cycle after decoding assuming that all of the input operands are ready. This assumes a current blocking single-entry (per iteration) operand buffer. This configuration automatically enforces an in-order execution model for each PPE (for each iteration). Moreover, the multiple entry operand buffer can allow for higher performance.

Additional tasks in the decoding cycle may include: providing an OREG slot request (as needed) for each instruction; Updating a BB/BE Reg, i.e., updating locally preserved 8-bit Branch-Begin and Branch-End registers (1 per loop-nest: shared across iterations); and handling predication of an entire loop.

Thus, once an execution iteration is picked (at the end of a previous cycle), the PPE can execute the decoded instruction (from the execution buffer) in the current cycle. Iteration information is preserved along the instruction execution pipeline along with other metadata information (BB, BE, Sync, etc.).

Referring back to FIG. 2, in order to effectively support iteration level commits (ILC) as well as simultaneous loop iterations (SMI), the Local Register Files 94 are configured for holding register data that is passed across commit boundaries. That is, in one embodiment, the LRF 94 is used for storing results that are consumed by instructions across iterations (Xiter) (defined as loop entry and exit points) or across Loop Basic Blocks (LBB). An example of Xiter instruction includes: an across-iteration dependency (for sums), Load-updates, store-updates, etc. An example of a LBB instruction includes: passing variables from outer loop to inner loop or vice versa. In one embodiment, the LRF and the OREG may be partitioned/banked in order to facilitate iteration level commits and/or recovery.

Figure 16:
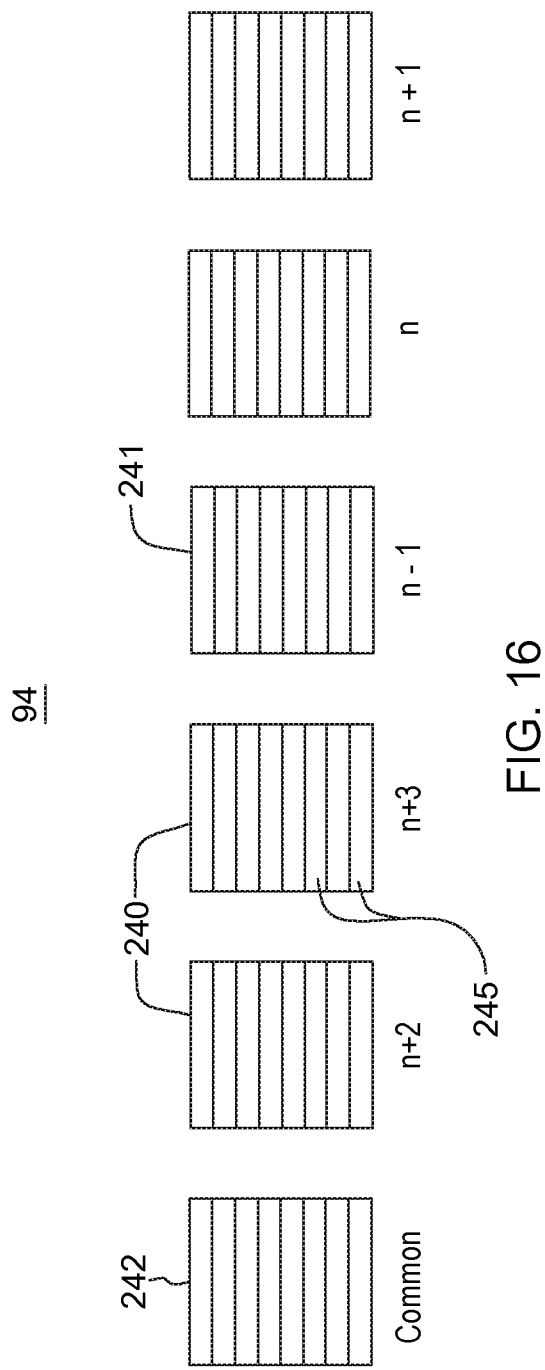
FIG. 16 shows, in one embodiment, the LRF organized into multiple logical memory register banks comprising one or more registers for storing iteration operations in flight.

With more particularity, as shown in FIG. 16, in one embodiment, the LRF 94 may be organized into multiple logical memory register banks 240, e.g., 6 logical banks. Each logical bank may be implemented as a separate physical bank or as one shared physical bank or a combination thereof. Each logical bank 240 may comprise one or more registers 245 for storing iteration operations. In one embodiment, the LRF 94 may have 8 registers per bank making a total of 48 registers for 6 Logical Banks. In one embodiment, the logical banks may be organized as 4 banks 240 to hold data for 4 iterations in flight (n, n+1, n+2 and n+3) where multiple nested iterations are started in parallel, e.g., the oldest iteration being "n" and is non-speculative, and the remaining n+1, n+2 and n+3 being younger and speculative iterations, a further bank 241 for previous iteration (n−1), and a common bank 242 (constants across iterations).

In a further embodiment, a physical bank 240 (e.g., one dimension or ID) of n−1 to n+3 may be round-robin/rotation based.

The LRF "common" bank 242 configured for holding data that cannot be modified in deeper loop nests. Thus, in any loop iteration, the common bank is written once and only read when inside the loop. For example, for a computation a=a+1000, the value 1000 may be assigned for storage in a slot in a common bank as its value does not change from iteration to iteration.

Each iteration in flight can only access data from LRF Bank of previous iteration for reads, current iteration for writes or common banks for read or write (e.g., 16/48 regs for R/W).

Rules may be implemented for automatic copying of registers from last iteration to the right bank number (upon exit or entry for a loop).

Further, the LRF 94 may be configured with 2 write and 2 read ports and use of the LRF may be assigned by the compiler.

Given an example computation "a=a+1", performed at each iteration, at each older (previous) iteration, there is computed a value of "a" during that prior iteration that is stored in a LRF bank. Before the loop starts (e.g., before a first iteration), the program obtains a variable, e.g., the value is copied from outside the loop into the "n−1" LRF bank. Thus, for a given iteration, n, there is obtained first the data read from the previous n−1 iteration that is stored at n−1 bank 241 by the program. For example, in the first iteration, a new "a" value is computed and (a=a+1) and the result written/stored into bank "n", e.g., slot 0. This stored value will be used by the next iteration n+1, and so on. That is, the process continues as each iteration "n" reads from a previous bank "n−1"; for example, loop iteration n+1 will read from bank n and place a result value in its own bank, and loop iteration n+2 will read from bank n+1 and writes the data into the n+2 bank, etc. Thus, in this example, the program reads a value stored in a previous bank for the current iteration computation and stores the result in its own LRF bank.

As mentioned, in the PPE 10 of FIG. 2, the Output Register Files 92 are configured for holding register data that is consumed within the commit boundary (same iteration and loop basic block). For example, OREG 92 include registers for holding register data, e.g., variables that are consumed by instructions within the same iteration. The OREG may also forward data to any PPE of an adjacent 8NN PPEs.

In one embodiment, the OREG 92 is a rotating register-file with an explicit head and tail pointer. In one embodiment, for example, there may be 16 rotating registers per iteration (e.g., a total of 64 registers). In this configuration, there may be four (=number of iterations) head and tail pointers of 4-bits each.

If an output tag in instruction field is non-zero (e.g., see output field 525 of FIG. 15 showing Bits 51 to 59 for ALU and Load Instructions), an instruction successfully decodes when it is assigned a slot in the OREG (i.e. OREG head is empty). That is, instruction bits 51 to 59 signify that the result of that current instruction is consumed by an instruction in any one of its eight nearest neighbor PPEs, e.g., directionally the nearest neighbors: NW-PPE (bit 51), N-PPE (bit 52), NE-PPE (53), W-PPE (54), Self-PPE (55), E-PPE (56), SW-PPE (57), S-PPE (58) and SE-PPE (59). That is, Bits 51 to 59 specify a 1-hot encoding scheme to designate which PPE receives the output results of this PPE.

In one embodiment, unlike instruction for writing to LRF, an instruction providing an output result and passing it to the OREG does not determine or specify (at compile time) an OREG register slot number. Rather, the PPE places a result value in a first available slot in an OREG The 64 bit instruction (including the 9-bit tag 525) will tell which destination PPE is for the result stored in the OREG. Until all the destination PEs have consumed or read the data, the data will be maintained in the OREG. When the last destination reads the data, the OREG slot will become available again.

Thus, an output-register slot number may be assigned at instruction decode time (i.e., given a dynamic register number). Further, metadata may be maintained in a separate structure (e.g., with many more ports to facilitate rapid identification of the right PPE and iteration targets during the data forwarding stage). Further, an output register slot number is preserved during execution and in the cycle after execution is complete (i.e., post-process), the data (73-bits) is written to the OREG.

In one embodiment, SMI applies only to the innermost loop of an iteration. The outer loops run one iteration at a time. However, the current design can be modified to support SMI at all loop levels. To support N-degree SMI for the innermost loop, N+2 logical LRF banks are needed. One LRF bank ($R_c$) is used to hold data used by all iterations (e.g., persistent live-ins). It can be read by any iteration. N out of the remaining N+1 banks are used to hold data for the N concurrent iterations in flight, and one bank is used to store data for the last committed iteration. Additional LRF banks might also be needed to hold variables (register information) to be passed between outer loops. IN one embodiment, both LRF and OREG register files employ rotating registers.

With more particularity, the LRF 94 uses the concept of rotating register files for the N+1 register banks used for storing variables for the N iterations in flight and one for the last committed iteration. The banks $R_0$ to $R_N$ are used as rotating register banks with a head pointer pointing to the bank associated with the oldest iteration. During execution if the oldest iteration in flight is j, the head pointer points to the register bank $R_{(j\ mod\ N)}$. $R_{(i\ mod\ N)}$ is the register bank associated with an iteration i. The ith iteration can write to the $R_{(i\ mod\ N)}$ bank and read from the $R_{((i\ mod\ N)-1)\ mod\ N+1}$ and the $R_c$ bank.

There are many different ways to logically and physically arrange the banks to provide this function.

In one embodiment, when execution of the innermost loop begins, $R_0$ to $R_{N-1}$ register banks are assigned to iterations 0 to N-1 respectively. The $R_N$ is used to pass on program variables needed by the iteration 0. A head pointer (not shown) is initialized to point to the $R_0$ bank.

After the first iteration is committed (e.g., the in-flight iterations being 1 . . . N), the head pointer is incremented to point to the $R_1$ bank.

In the event of a system save-state (including context-switch), the contents of the LRF bank containing the last committed iteration, the common bank and the banks used to pass data between outer loops are saved to memory.

Restoration involves bringing back this content from memory and installing it in the correct LRF banks prior to resuming execution.

Further, in supporting SMI, the OREG 92 is used to the hold the results of computation in the PEs—that are consumed by itself as well as other PEs in the same iteration and loop-nest (i.e. within a commit boundary). Since the OREG deals entirely with register information contained within a commit boundary, the contents of the OREG do not have to be saved and restored upon system checkpoint, recovery and rollback, e.g., the data can simply be squashed. In other words, the OREG does not have any information in it that is pertinent to ILC operations. In order to support SMI for the innermost loop, the output register itself needs to hold register values/data corresponding to a maximum number of iterations (ITERMAX) that are supported by the CGRA architecture. This is accomplished through the use of multiple (ITERMAX) logical output register banks (each with a given number of entries). These logical banks could be organized as a single physical bank or separate physical banks.

ECU/PPE

Figures 3A, 3B:
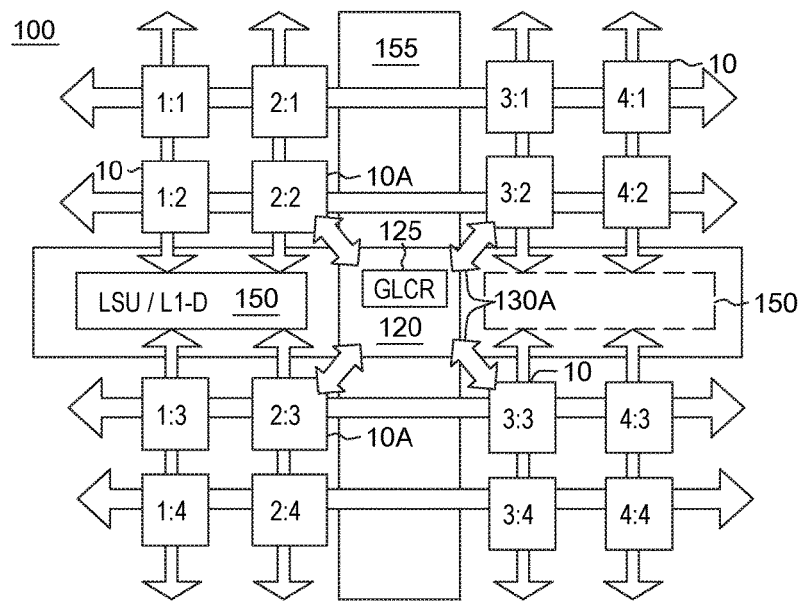
FIG. 3A shows a control hardware component for synchronizing and tracking multiple concurrent iteration processes among multiple PPEs.
FIG. 3B shows signals communicated between various control hardware components of FIG. 3A for synchronizing and tracking and the multiple PPEs.

FIG. 3A shows a control hardware GCLR component 125 of the ECU used for synchronizing execution of concurrent iterations across the PPE array and for tracking multiple concurrent iteration processes among multiple PPEs of the CGRA system 100. The ECU 120 further maintains loop iteration information for PPEs that do not know what loop execution it is running. For example, a GLCR 125 in the ECU 120 maintains values of the 32-bit current loop count for the each iterations in flight (e.g., for a deep loop nest).

In FIGS. 3A and 3B, a group of PE's 10A have special connection with the ECU 120 via wide-busses 130A to communicate signals for setting a START value 190A, an END value 190B, and a DELTA value 190C for each loop nest level.

FIG. 3B depicts further signals communicated between a PPE 10 and a ECU 120/GLCR 125 for maintaining synchronization and initiate and terminate loops within the PEs in conjunction with ILC and SMI functionality. These signals include, but are not limited to: LSYNC 191; GSYNC 192; LOOPEXIT 193; LOOPCOMPLETE 194; LCRINC 195; CHECKPOINT signal 196; LOOPPRED signal 197 and GLCR REQ 198 and GLCR 199.

The LSYNC (or SYNC) signal 191 is a 2-bit signal issued by a PPE 10 to indicate to the ECU 120 that a new loop is ready to begin execution in the PPE. A 2-bit LSYNC value of "11" indicates to the ECU that the following loop is the innermost loop.

GSYNC signal 192: For the ECU to indicate to the PPEs 10 when a loop execution may now commence. The GSYNC signal 192 is fired after the ECU 120 receives the LSYNCs from all of the PPEs involved in running a program or a loop on a PE array. The GSYNC bus is also used to selectively turn on SMI if the loop to be executed is an inner loop. This GSYNC is a 2 bit signal and each of the PPEs wait to receive the GSYNC to begin execution. ECU controls enablement of SMI by sending a 2-bit value of "11".

LCRINC 195: When each of the PEs 10 running a loop reaches the end point of the loop (for a given iteration) each PE will issue this 1-bit LCRINC signal to the ECU. The ECU is expecting to receive these from all PPEs executing a loop iteration. Once all the PEs send this LCRINC signal to the ECU, ECU 120 sends a commit request to the LSU 150 over bus 145 as shown in FIG. 1. The LSU 150, after committing the stores of the oldest iteration sends an acknowledge. At this point the GLCR counter 125 will increment by the delta value of the loop, and CHECKPOINT 196 is asserted by the ECU for all PEs 10. Upon receiving CHECKPOINT 196, PEs 10 can checkpoint the register values corresponding to the committed iteration and start a new iteration speculatively.

LOOPEXIT 193: For loops with data dependent loop exits, any PE can signal to the GLCR that the loop execution has to terminate after the completion of the current iteration. This addresses a dynamic condition that cannot be determined or accounted for in advance at compile time, wherein a PE may execute an instruction and may evaluate a condition requiring a break from the loop. Any PPE can send this 1-bit signal to the ECU.

LOOPCOMPLETE 194: When all iterations of a loop are finished, the ECU will indicate this signal to all PEs 10 that the loop has finished and the PEs can resume execution beyond the loop iteration point. That is, when ECU sees all loop iterations have been executed it will issue a signal to each of the PPEs in the array running the loop. The PPE will resume operation at the "next" instruction after the finishing the prior loop.

LOOPPRED 197 (predicated loops). ECU issues this to each of the PEs in the array. If loop evaluates some condition as True—predicated as true—the loop execution will continue processing at the PE (i.e., a predicated loop); if loop condition evaluates as a False condition—predicated false—there is no need to run any iteration of the loop. This signal is sent to all PPEs 10 in conjunction with an ECU issued GSYNC signal to indicate if the loop is predicated true or false.

In most of the cases, a loop has a starting point, end point, and a delta, i.e., a step in which a loop variable increments. However, in some cases these values can't be determined at compile time. The ECU has a default value of 0 for START, INT_MAX for END, and 1 for DELTA. Before entering a loop execution, the following loop parameter signals are optionally asserted by the PEs as determined by the compiler:

START (e.g., a 32 bit signal) 190A—This start value is calculate by a PPE and communicated as a signal to the ECU prior to commencement of the loop. For loops whose start value can't be ascertained, this is not asserted.

END (e.g., a 32 bit signal) 190B—The value calculated by a PPE and communicated as a signal to the ECU for indicating a stopping value when the loop is expected to end. For loops whose start value can't be ascertained, this is not asserted.

DELTA (e.g., a 32 bit signal) 190C—The value of a variable increment calculated by a PPE and communicated as a signal to the ECU before initiation of the loop.

These start, end and delta values may be calculated by PEs according to the compiler and scheduler determined at compile time. It is understood that not all PPEs generate these signals, but a subset of PEs may calculate these start, end and delta values, and are communicated to the ECU at execution time.

In the LLCR 50 local to each PPE 10, a loop iteration count may be maintained within the respective PE. The LLCR assumes the START value of 0 and DELTA of 1. Whether LLCR is to be used during execution is determined by the compiler and encoded as a part of the instruction. In all other cases, the compiler instructs the use of GLCR. In most instances, when a PE is to load an iteration count, it requests a current iteration count value from the ECU 120. Thus, as shown in FIG. 3A, a PPE 10 will issue a GLCR REQ signal 198 (e.g., 1 bit) for communication to the ECU 120 to obtain a current iteration count. The ECU 120 responsively returns a loop iteration count value 199 (e.g., 32 bits) as a GLCR signal 199 back to the requesting PPE.

The ECU 120 thus performs functions for: 1) receiving LSYNC signals from the PEs (indicating that the individual PEs) are ready to begin loop execution; and 2) maintaining a one-hot encoding scheme to keep track of LSYNC signals received from all of the PPEs. The LSYNC signal also has information on whether SMI functionality needs to be enabled for the upcoming loop.

In view of FIG. 3A, when the ECU receives the LSYNC signal 191 from all of the PEs, it then sends out a GSYNC signal 192 back to all the PEs indicating that loop execution can now begin. The LSYNC and GSYNC signals are used for synchronization of execution across the PPE array. The ECU 120 may further obtain values (to override default values) of the loop-begin, loop-end, loop-delta and degree of SMI for each loop. The ECU 120 may further maintain absolute and incremental loop count registers for the maximum degree of loop-nesting supported.

The ECU performs functions to set the final value of the loop trip-count (during/after loop-execution) based on the LOOPEXIT signal 193 received from one or more PEs. This is a mechanism by which any of the PEs can cause a data dependent loop exit.

In one embodiment, the ECU uses a 1-hot encoding (loop-sync) register to keep track of the loop-iterations that are completed in every PE based on the LCRINC signal. It then uses this 1-hot loop-sync register to commit loop-iterations when all the PEs have completed the oldest loop iteration.

In one embodiment, as a default for most instructions, a pre-defined "SYNC" bit is set to zero; however, when the SYNC bit is set to one in a current instruction, then the instruction waits after the current instruction and then globally coordinates with the ECU. It does so by sending the 1-bit signal (LSYNC) to the GLCR. Once the GLCR receives the 1-bit signal from all PPEs, then it sends a GSYNC signal back to all of the PPEs—at which point all PPEs can resume execution. Each GSYNC also sends back loop-counter value on an LCBUS (not shown). Thus the SYNC bit in the instruction is normally used to synchronize all the PPEs—before entering or exiting loops. Since loop exits are marked by backward-taken branches, even if the branch instruction has a SYNC, a SYNC is asserted only if the loop actually exits (i.e. the backward taken branch is not taken). The GLCR also uses the synchronization process (GSYNC) to load a new value of the loop-counter in itself as well as all LLCRs (Local Loop Counter) in the PPEs.

With more particularity, the ECU 120 use LSYNC and GSYNC control signals for: Synchronization between PPEs, GLCR and LSU prior to entering a loop; Turning on a SYNC bit for the last instruction of every PPE prior to a new loop entry point; Once an instruction with its SYNC is decoded, inhibiting further decoding in the PPE until the PPE receives a GSYNC signal 192 from the GLCR. In a post-process cycle of this last instruction, the PPE then sends out a LSYNC signal to the GLCR. When the ECU 120 has received all of the LSYNCs (e.g., from all of the PPEs using 1-hot register), and the LSU finishes commit of all the stores until this point, the ECU sends out a GSYNC signal 192 back to the PPEs who can then proceed to execute instructions from inside the loop.

Functionality includes marking the instructions at the beginning and end of any loop using the branch begin (BB) and branch end (BE) bits. PPE's further require completion of a loop iteration in order. When the PPE is in a post-process phase of a BE instruction, the PPE will send out the LCRINC 195. The ECU maintains the 1-hot register for all PPEs for all iterations in flight and sends a CHECKPOINT signal 196 when all the PPEs have finished a loop iteration. Upon successful completion of loop execution (e.g., when the final trip count has been reached), the ECU sends out a LOOPCOMPLETE signal 194 to all the PPEs—so they can update their program counter (PC), for example, to 1+BE, i.e., to indicate that execution can now continue in the instruction beyond the loop end.

ILC

Referring back to FIG. 1, embodiments provide a CGRA architecture 100 that is configured to execute iteration level commit (ILC) such that, when CGRA is configured with dynamic issue, each PE 10 can execute its next available instruction (whenever its operands become ready and independent of other PEs). As a result, it is possible for different PEs to be out of sync with each other (with regards to loop iteration number). Thus, whenever a system interrupt or exception happens, ILC operations are run to save the "state" of the system as well as to restore that state when the process/thread is reactivated in the CGRA.

The system and apparatus needed to perform iteration level commits and recovery is now described in greater detail. In one aspect, the plurality of processing elements of system 100 employs hardware and methods for committing instructions at loop iteration boundaries. System 100 apparatus and methods are configured for: tracking and buffer state of in-flight iterations; detecting conditions that prevents an iteration from completion; undoing the effects of failed iterations including load store unit, local register files, local and global loop counters and ability to execute SMI; and saving and restoring context at iteration level boundaries.

As shown in FIG. 1, bus connections 145 between the ECU 120 and LSU 150 carry signals 135 including signals used to perform simultaneous multiple iterations (SMI). These SMI operations, for a loop, run iterations in sequence. The PPEs 10 when they do not have instructions for the oldest iterations, will speculatively start a new iteration as supported by the hardware. Thus, running a non-speculative iteration (e.g., an oldest iteration) while running one or more speculative iterations is an example of SMI. ILC is needed to support SMI.

In support of SMI and ILC functionality, the LSU 150 tracks multiple load and store instructions in-flight using load and store queues (LSQ) to track such operations until their successful completion. The LSU supports searching all the elements of the load and store queues in parallel to ensure that: 1) the latest (or "correct") value of data is supplied to a load (memory fetch) operation; and 2) all the writes (memory updates) are serialized. The LSU 150 supports completion of the in-flight store operations only when it is safe to write to the memory without requiring a roll-back.

Figure 4:
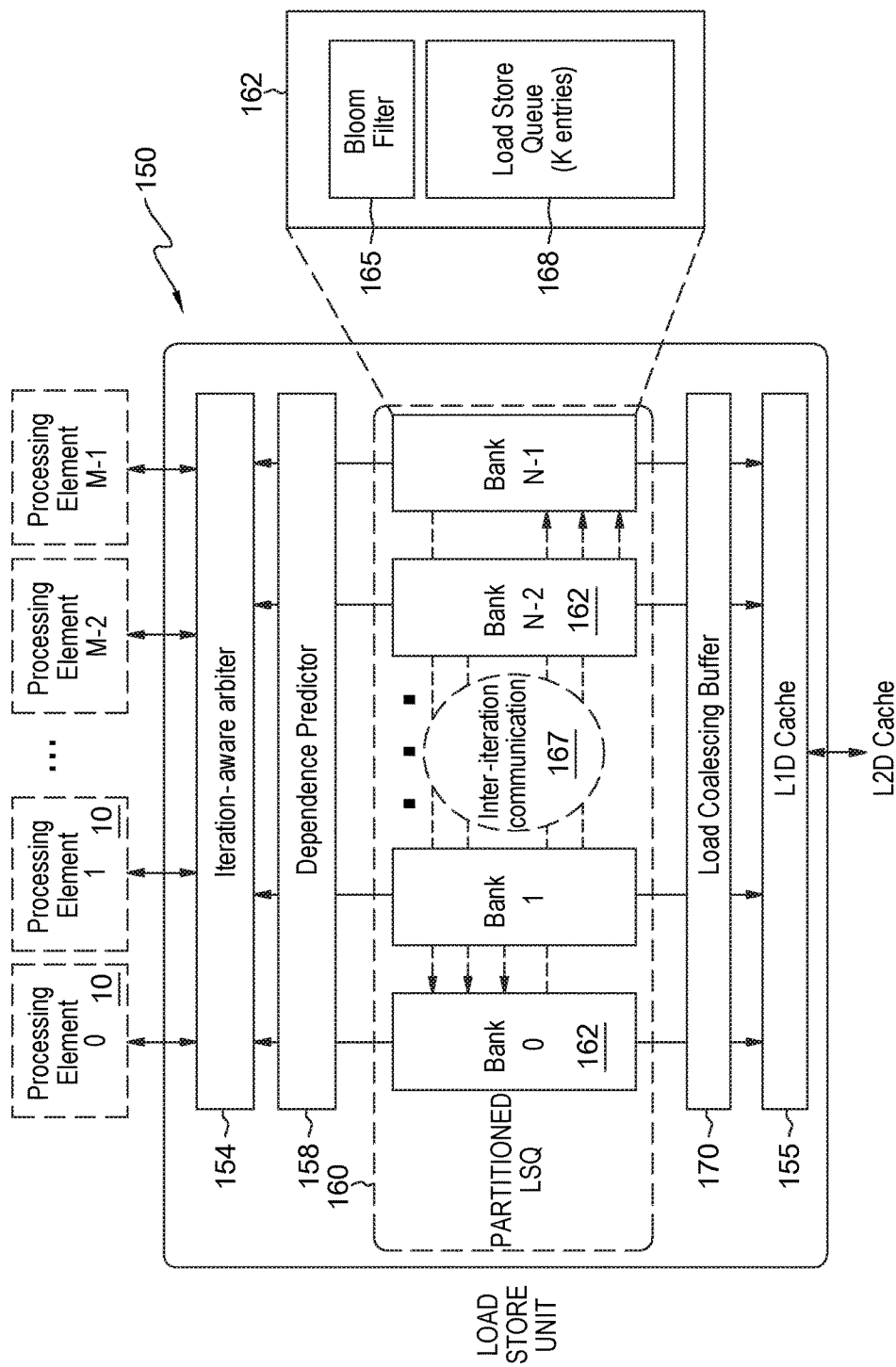
FIG. 4 shows a detailed block diagram of the Load Store Unit (LSU) according to one embodiment for supporting SMI and ILC functionality.

FIG. 4 shows a detailed block diagram of the Load Store Unit (LSU) 150 for supporting this SMI and ILC functionality. The LSU 150 provides a partitioned Load Store Queue (LSQ) structure 160 that includes a plurality ("N") of LSQ banks 162. Each LSQ bank 162 includes a bloom filter 165 and multiple load-store queue entries (LSQs) 168. In one embodiment, each LSQ bank is configured with K entries for holding load/store instructions of an iteration executed on M processing elements 10 (e.g., M=16 PPEs).

Each LSQ bank 162 is a temporary memory of data (loads and stores waiting in a queue to go out to memory). The LSQs store the loads and stores for each iteration, and each iteration is assigned a corresponding bank 162. K is the number of entries in an LSQ bank; thus, for a given iteration, there can be queued up only up to K loads and stores. Thus, for example, N=4 such that a bank corresponds to each concurrent iteration currently running or in flight (e.g., n, n+1, n+2 and n+3) and that each may store load and store information for that iteration. It is understood, that the system may support N=8, banks corresponding to eight concurrent iterations in flight.

Included in LSU 150 is an iteration-aware arbiter 154 for assigning a load/store instruction from a PPE 10 to the appropriate LSQ bank 162. In one embodiment, the Iteration-aware arbiter 154 uses an iteration ID to assign loads/stores to an appropriate LSQ bank 162. In one embodiment, each LSQ banks 162 is organized as a circular queue with the oldest iteration being held in the bank at the head of the queue. Here the loads and stores tagged with the iteration number of older program iterations (e.g., n, n+1, n+2, n+3) are given higher priority over the loads and stores of a later program iteration.

In one embodiment, a unique load/store ID (LSID) is assigned at compile time to each load/store instruction of an iteration. Further, each load/store instruction has a dedicated slot in a given LSQ bank 162 based on the LSID (which determines the offset into the queue). Thus, in a LSQ 168 of a given bank 162, the LSIDs are ordered for a given iteration, and thus the age of the load and stores is known within a bank based on their LSID.

However, from bank to bank the iteration number is known, and this informs if there are any loads or stores form an earlier iteration that is going to the same address as a load or a store from a later iteration. This dependence is captured by an inter-iteration communication infrastructure or block 167 (busses, conductor lines). This dependence is needed to detect a store in an older iteration that has provided a value for storage into memory, and a load from a later iteration that reads the same memory address to get the value. Inter-iteration communication block 167 guarantees that the load is not performed (i.e., waits) and gets the value until after the store writes to the memory, and cannot read the memory before the store has written into that memory to comply with a programmer's intention (i.e., that the store from earlier iteration will write data to the memory, and the load from a later iteration will read that data from that memory address).

Thus, for a later iteration load instruction, the method performs checking all the stores 162 of LSQ unit 160 of earlier iterations to ensure that there are no stores that go to the same address. If there is located a store that goes to the same address, then the load will detect a collision with that store at the same address. Upon detecting this collision, the LSU 150 responds by guaranteeing that the later load operation will wait until the store at the same memory location and belonging to an earlier iteration executes in order to write the correct value into that same memory location for the load.

Thus, using inter-iteration communications infrastructure (busses, conductor lines) 167, for every load instruction, the method performs checking all of the banks 162 belonging to older (earlier) iterations than the iteration of the current load instruction, e.g., using infrastructure 167, to look for store addresses that go to the same memory address as the current load instruction to ensure there is no such store operation (in which case the load instruction will commence) or determine whether it needs to wait until the correct value is written.

In one embodiment, if there are multiple stores at the same address as a load of the younger iteration, then the iteration closest in time to the current load operation is selected, and the process will wait until that store writes to the memory address.

Similarly, using inter-iteration communications infrastructure 167, every store instruction has to look at banks corresponding to younger (later) iterations to determine whether the store operation can feed the data to a later matching load instruction.

Figure 13:
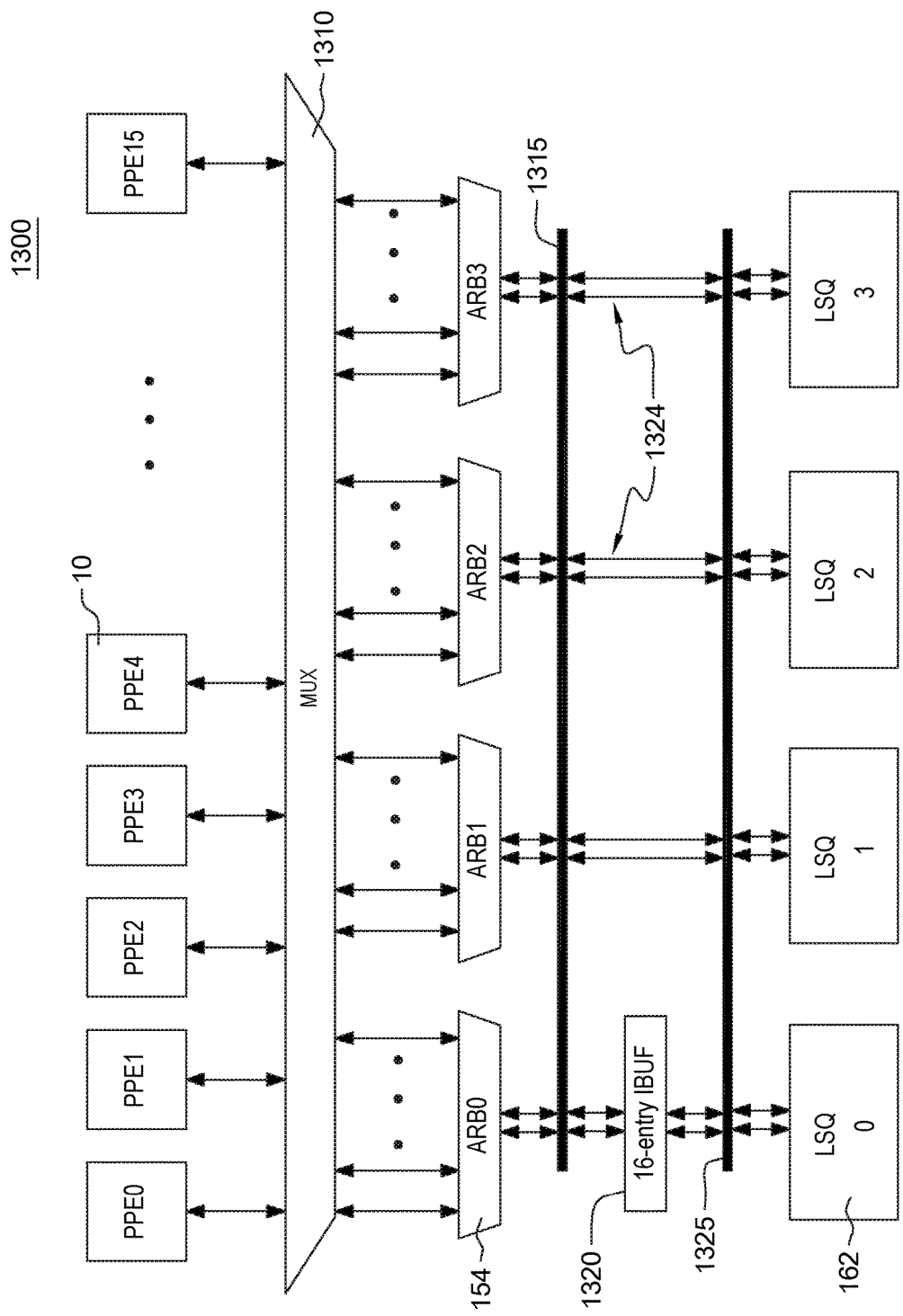
FIG. 13 depicts a switch network structure 1300 for connecting the 16 PPE to 4 LSQ banks and for enabling inter-iteration communications in the LSU.

FIG. 13 depicts a switch network structure 1300 for connecting the 16 PPE to 4 LSQ banks and for enabling inter-iteration communications in LSU 150. In a first switch network, there are connected 16 PPEs 10 and 4 LSQ banks 162 via busses. A further switched networks in LSU connects 4 LSQ banks and 4 L1D cache banks. Since always non-speculative iteration in LSU has higher priority than others, these networks also process the memory instructions from the LSQ bank of the oldest iteration at first if they are available.

In the network architecture 1300 there is connected 16 PPEs and 4 iteration-interleaved LSQs. When a LD/ST memory instruction comes from a PPE, based on its iteration number, a multiplexor and arbiter switches route the instruction to the appropriate bank. Since 16 memory instructions could be generated from any iteration as an example, (request congestion), there is a further mechanism that back-pressure the PPE whose instruction cannot be installed in a bank. When congestion occurs, instructions with older iteration number and LSID are always prioritized and served first.

In FIG. 13, the multiplexor MUX 1310 receiving the instruction decides the target LSQ bank 162 of instructions from PPEs 10 based on the iteration number of LDs and STs. The arbiter 154, e.g., ARB0-ARB3, handles priority based LSQ bank fetch scheduling via busses 1324 and 1315 and 1325. Only the non-speculative iteration is designed to buffer memory instructions when more than two (e.g., number to number of ports in LSQ) instructions reach to the same bank, the instruction will be queued to the 16-entry buffer 1320 via bus 1324.

In one embodiment, as each LSQ bank has 2-port input structure, the buffer 1320 also has 2 ports, and rest instructions belonging to speculative iterations are processed two instructions at a time. If more than two instructions have been requested to the same bank, rests of two requests are back-pressured. In this case, each PPE cannot generate another memory request, but waits until the memory request can be processed. A 1-bit "ready" signal is used to indicate that a PPE can send a memory request again to the LSU.

In one embodiment, the switched network 1300 connects four (4) iteration-interleaved LSQs and four address-interleaved cache banks (not shown in FIG. 13). Based on the address of committed memory instructions from each bank, the network selects one of the cache banks. Like the switch between PPEs and the LSQs, this switch has two main functionalities as follows: priority-based memory instruction routing; and conflict handling. The cache banks and the related switching are known in prior-art for any address interleaved cache banks and is not shown in FIG. 13. Based on its address, a memory instruction should use one of the cache banks. At this time, the multiple requests can conflict in a bank; it selects the highest priority request among them by an assigned LSID and iteration number. Always an instruction which has lower iteration number and lower LSID should be handled first. Rest of them will be waiting in the LSQ until the switch selects their order.

In one embodiment, L1 D cache 155 may be address interleaved into multiple banks for sustaining high bandwidth between LSQ banks and the cache.

Address-interleaved cache banks, and relevant portions of its operations are now summarized. With respect to the address-interleaved cache banks, each cache bank handles one LD and one ST instructions at a time. In one embodiment, the cache line is 64-byte. The address-interleaved cache bank structure's main responsibilities include: 1) Load-miss handling; 2) Filtering redundant read LD requests (for LD misses) to L2 cache, and employing a miss status handling register (MSHR) is employed (not shown in FIG. 13). The 16-entry MSHR contains metadata of LD instructions such as LSID, bank number, target PPE addresses. When the requested data is ready, based on the information, it is transferred to the corresponding entry of a bank; 3) Store coalescing—to increase the data bandwidth utilization and effective bandwidth between L1 cache and L2 cache, a 64-byte ST merge buffer is employed to coalesce one cache line with multiple small ST requests.

PPE/LSU

As further shown in FIG. 1, the bus connections 135 between PPE array 110 and LSU 150 carry signals including signals used to support simultaneous multiple iterations (SMI). FIG. 10A shows following signals communicated between a PPE 10 and the LSU 150 in support of ILC and SMI functionality. These signals may include but are not limited to:

An LD/ST REQUEST signal 133: The PPEs 10 issue Load (LD) or Store (ST) requests 133 for receipt at the LSU 150, and include issuing a corresponding LD/ST ADDRESS signal 137 for the corresponding operation. Further issued signals include: a ST DATA signal 134 which is the data that is actually communicated from a PPE to the LSU for memory storage. For example, for store requests, a PPE sends the store data (providing data) using STDATA signal 134 to the LSU; and a LD DATA signal 136 sent by the LSU to the PPE which includes the data requested by the PPE from the LSU. Each LOAD DATA operation 136 or STORE DATA operation 134 has the associated LD/ST identifier, i.e., LSID 138 communicated from the PPE 10 to the LSU 150 which is an identifier used to keep track of the issued LD request or ST request 134 and may be an additional 6-bit field which, as explained, is used to order loads and stores within and across iterations.

A further ITERATION ID signal 139 is communicated from the PPE to the LSU 150 which is an identifier associated with each iteration as there may be multiple iterations in-flight that are sent from the PPE to the LSU (e.g., 2 bits for four in-flight iterations).

Referring to FIG. 4, in one aspect, it is desired that data be pushed from the PPEs into the cache, e.g., L1/L2, as soon as a result is available. However, all stores must be held locally until the iteration has finished. That is, when running an iteration, and encountering a "store", it is put into LSQ. In one embodiment, the LSQs (banks) of FIG. 4 are configurable to correspond to the number of iterations (e.g., four iterations n, n+1, n+2 and n+3 in an example). Each LSQ bank is configured to store load and store information for a respective iteration, i.e., the data stored in the LSU are organized according to iteration level, each iteration loading and storing data to its own LSQ. Thus, ILC pertains to holding off all the stores in the LSQ bank until an indication is received that that iteration has successfully reached an endpoint. Until the fate of an iteration is determined, all stores for any one iteration will be held for all iterations in flight until an iteration endpoint is reached. The method ensures that an oldest iteration finishes first. At such time, once an oldest iteration is finished, then all work done on that iteration can be safely committed to memory, i.e., the LSU will commit all the stores of the oldest iteration into the memory (e.g., L1 D).

To accomplish this, the plurality of PPEs 10 of FIG. 1 are each configured for committing instructions at loop iteration boundaries. Thus, the apparatus 100 performs tracking and buffering the state of in-flight iterations. This apparatus further detects conditions that prevents an iteration from completion. Further, the apparatus is configured for undoing the effects of failed iterations including load store unit, local register files, local and global loop counters and ability to execute. The apparatus will save and restore context at iteration level boundaries.

Currently, every PPE is assumed to be connected directly to the LSU. For loads, the load address, iteration number, LSID and the Load-Store PPE Tag are passed from the PPE to the LSU. For stores, the store address, store data, iteration number, LSID are passed from the PPE to the LSU. For loads, the load data along with the Load-Store PPE Tag are passed back to the PPE from the LSU.

In one embodiment, falsely-predicated loads and stores are not sent to the LSU 150. Note that it is in principle possible for all PPEs to send Loads and Stores to the LSU in any cycle. LSU assumed to only accept up to 4 loads and stores—the rest are rejected by the LSU, and the PPE will re-try until it is successfully able to send the load/store to the LSU.

PPEs may execute a different instruction in the following cycle and try the load or store instruction again in a few cycles.

As mentioned, the LSU 150 of FIG. 4 preserves program order within an iteration using the unique LSID in a given LSQ bank. Further, program order across iterations is preserved using iteration ID assigned to an LSQ bank 162.

Generally, there are two hazards in this LSQ architecture: 1) Store hit load (SHL) hazard; and 2) Load-Hit-Store hazard (LHS).

The Load-Hit-Store hazard occurs when a younger dependent LD arrives after the older ST instructions have been installed, the LD instruction should receive its dependent data from older STs, not from L1 cache. To recover from the violation, LSQ employs ST forwarding mechanism.

This LHS hazard requires data to be forwarded from an in-flight older store operation to a younger load operation. In support, within an iteration, the method uses the assigned LSID to determine the older store and the younger load accessing the same memory address region. Further, in the LSU architecture, across iterations, when a load instruction checks for a possible matching store, it is sufficient to check only LSQ banks 162 of prior iterations for a matching store instruction.

Further, the LSU architecture detects a Store-Hit-Load hazard that occurs when an order dependent ST arrives after the younger LDs have been installed, since the LDs have obtained stale data from L1 cache, all related instructions after the ST should be flushed. To recover from the violation, it flushes all the instructions of the LSQ bank that contains a violated instruction and replying from the beginning for the iteration Thus, the SHL hazard requires an iteration to be flushed due to a memory write to read violation (e.g., a stale value has been read from memory by a load from a later iteration before the store from an earlier iteration could supply the latest value). In support, within an iteration, the method uses the LSID is used to determine when the older store matches a younger load that read memory out-of-order. Further, in the LSU architecture, across iterations, when a store instruction checks for a possible matching load, it is sufficient to check only LSQ banks of later iterations for a matching load instruction.

As mentioned, in load and store operation processing, each LSQ banks 162 must be accessed and every single entry in every bank must be checked. However, with implementation of a fully associated content addressable memory (CAM), this check is expensive and time consuming Thus, a bloom filter functionality is provided to help determine if a given address is at all present in the queue or not.

Thus, as shown in FIG. 4, in one embodiment, the LSU 150 includes a Bloom Filter 165 in each LSQ bank for filtering out unnecessary requests of associative searching between LSQs by tracking all in-flight instruction's address information in its table. In support, functionality is provided to determine a match in the bloom filter such that the full LSQ bank 162 is searched associatively for the matching load/store instruction.

Further, LSU 150 includes a Load Coalescing Buffer (LCB) 170 for data store forwarding. This buffer collects requested data for a load instruction when multiple dependent store instructions across iterations and/or memory contribute to the data requested by a load instruction.

There is further provided a dependence predictor module 158 (DPR) for tracking violation history of input instructions using the iteration LSID, and deferring the service of the load instruction until all prior store instructions are installed to LSQ banks to avoid repetitive memory access order violations.

Dependence predictor block 158 determines whether any data dependency exists between loads and stores. For example, if there is a store instruction that is ahead of the load instruction and stores to the same memory address as the load instruction, then the predictor 158 will catch this dependence and determine that it should not load a stale data value in the memory, i.e., it has to wait until after the store instruction is run for that memory location to have correct data. The predictor recognizes that it just performed a store to that memory, and the load is to the same memory so a dependence relation exists. This ensures that load instruction will wait until the corresponding store instruction is implemented. It will hold off performing the load to the memory until the proper store instruction has been implemented to preserve the proper order, i.e., the load and store dependence is captured within an iteration and between iterations from one or more processing elements.

An example operation scenario of memory instructions in one LSQ bank is now described. In one embodiment, one LSQ is designed to handle a group of instructions from one iteration loop with the help of one DPR, one BF, one LSQ and L1 D-cache.

Figure 6:
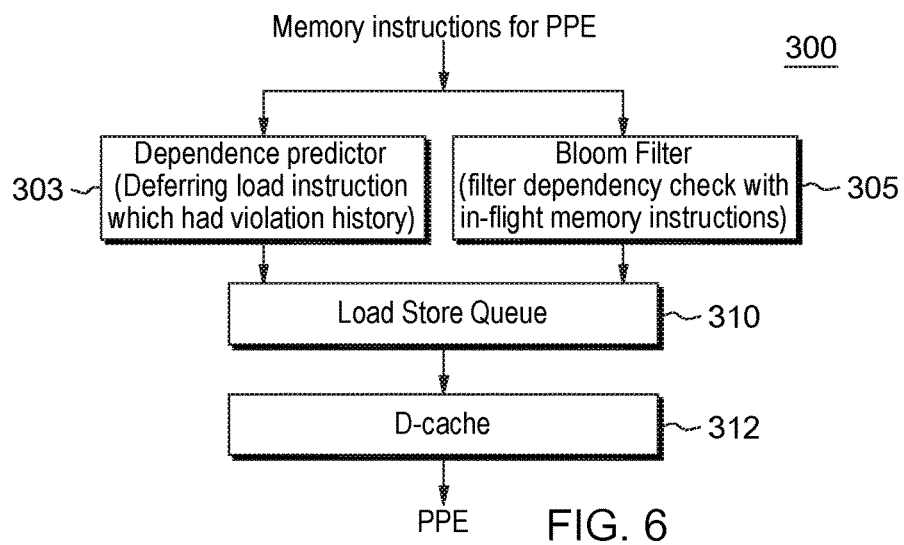
FIG. 6 shows an overview of a basic method involved in LD and ST processing in the LSU and the pipelines that implement the LD/ST processing steps.

FIG. 6 shows an overview of the basic method 300 involved in LD and ST processing in the LSU and the pipelines that implement the LD/ST processing steps. At receiving an instruction, using an iteration number of the instruction, there is determined which LSQ bank to be used based on its iteration number. Then, the LSU accesses the LSQ bank and simultaneously performs at 303 accessing the DPR and at 305 accessing the BF of each bank 162 to simultaneously check that: 1. in the DPR, whether a LD instruction should be deferred or not based on its violation history with dependent ST instructions; and 2. in the BF, whether associative CAM search is needed or not based on its BF's table that records addresses of all in-flight memory instructions in one bank.

Since the input of DPR is instructions of the target LSQ, it solves the memory dependence problem between LD and ST instruction for the iteration. That is, if an earlier store instruction of the iteration accesses the same address as the later load instruction in the iteration, and if the later load instruction reached the LSQ prior to the earlier store, then the load would have read stale memory data. When the earlier store instruction finally arrives at the LSQ, a SHL (Store-Hi-Load) condition within an iteration is detected, and this is captured in the dependence predictor. The iteration is now flushed, and re-started. In the new execution of the iteration, if the same faulting load instruction arrives prior to the older store instruction, the DPR entry will show a match indicating that the load instruction encountered a SHL condition in the past. So the load instruction is not allowed to execute (access the memory), and waits until all the older store instruction arrives at the LSQ and supplies the data.

Otherwise, since the input of the BF is an instruction from different iterations, or banks, the BF determines the memory dependency of all in-flight memory instructions across different banks. Based on the response of DPR and BF, the method accesses the LSQ at 310 for associative CAM search to gather related data at 312, e.g., from L1 cache. In one embodiment, the L1D caches 155 are address-interleaved and partitioned across four cache banks: thus supporting up to four LDs and STs every cycle, based on the assumption that each bank has one port for LD and one port for ST. In addition, the LSQ and miss handling mechanisms are also completely partitioned. The LD and ST instructions can be mapped onto any of the sixteen PPEs. The load/store instructions issue from the PE execution units to the LSU when all their inputs are available, and are then delivered to the LSU through its direct channel to LSU.

FIG. 7 shows an example Table 325 that summarizes the possible LD execution scenarios in the LSQ 160.

In table 325, first row 330 indicates a scenario in which the system performs detecting a DPR hit in which an LD instruction may arrive at the LSQ 162 before an earlier ST on which it depends. Processing such a LD right away will result in a dependence violation and a flush leading to performance losses. To avoid this performance loss, the employed dependence predictor 158 predicts whether the LD processing should be deferred. If the DPR predicts a likely dependence, at 331 the LD instruction waits in the LSQ until all prior STs have arrived. After the arrival of all older LD and ST (not just older ST that goes to the same address region), the LD is enabled from the LSQ, and allowed to access the cache and the LSQs to obtain the most recent updated ST value.

In one embodiment, the predictor module 158 will monitor the loads and stores into the LSU and use the iteration Number and the LSID (i.e., indicating the age of the iteration) to determine if it is younger than the load or older than the load in program order. Using this information, the predictor will determine a collision and prevent that the load operation from reading a stale value from the memory. That is, if it detects a dependency, at 331 it will hold off the load operation from going to memory until the corresponding stores have been performed.

In one embodiment, there are two operation phases in DPR 158. With reference to FIG. 8A, the DPR 158 processing 375 includes performing a dependency check: i.e., checking whether one LD instruction has a violation history with other ST instructions which access the same address, and prevent them from occurring again in the future. The DPR 158 obtains the LSID 138 (i.e., indicating the age of the iteration) of the LD instruction as input and checks for the violation against an m-entry, 1-bit array 380 (m refers to the number of LSIDs in an iteration). For example, LSID is used to index into the array 380 to determine at 382 a violation condition or non-violation condition for the current load. Violation history among different DPRs in different LSQs could also be synchronized as they are accelerating the same instructions of a loop (but different iteration).

Figure 8B:
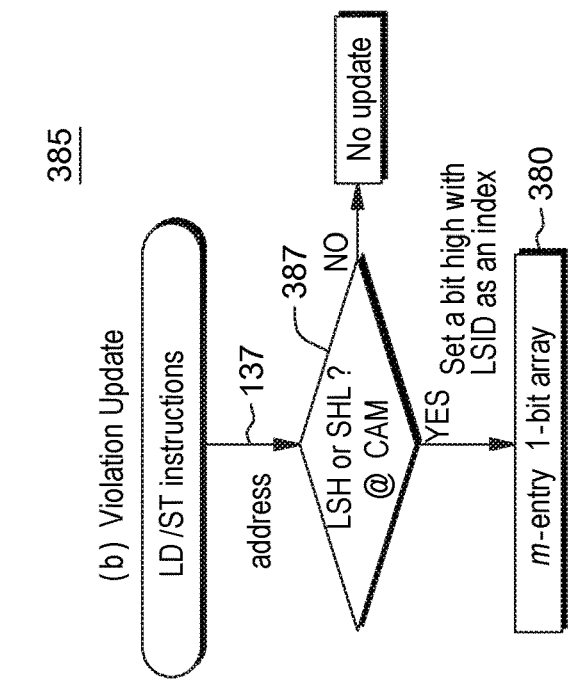
FIG. 8B shows the violation update procedure 385 in which for a current LD or ST instruction, it is determined whether a LSH (hazard) or SHL (hazard) exists for that instruction.
Figure 8A:
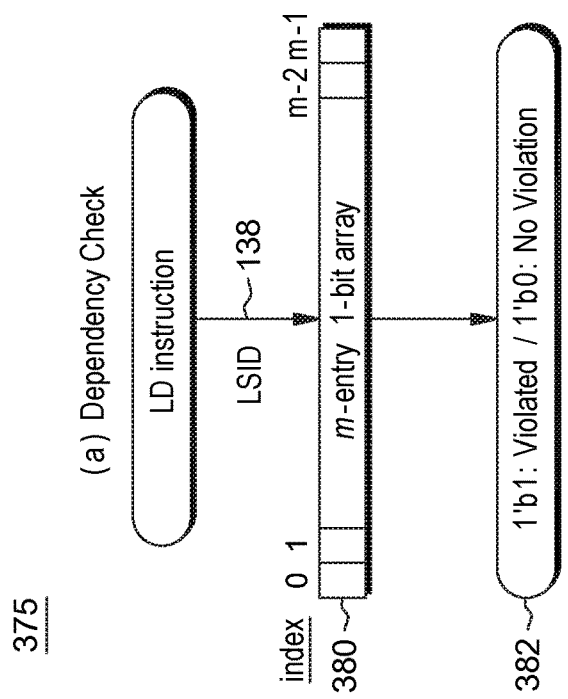
FIG. 8A shows operation of the dependence predictor unit (DPR) processing 375 that includes performing a dependency check.

FIG. 8B shows the violation update procedure 385 in which for a current LD or ST instruction, it is determined at 387 whether a SHL (hazard) exists for that instruction. If no hazard exists based on the current instruction, then the m-entry 1-bit array 380 is not updated. When it gets a violation report from ST instructions 139, i.e., SHL hazard is detected at 387, dependency checker records it in the array 380, e.g., by setting a bit high with the LSID as an index into the LD's m-entry 1-bit array (m refers the number of LSIDs in an iteration).

Returning to FIG. 7, in one embodiment, table 325 shows row 335, 336 and 337 indicating a scenario in which there is no detected DPR hit, however there is determined a hit in the bloom filter (BF hit) in which the LSU has recorded that dependent ST instructions have been installed to LSQ bank, in which case it informs a LD should perform associative CAM searching to check for LHS hazard. In case of ST instruction, the BF informs that dependent LD instruction had been installed to the LSQ bank, so it informs a ST should perform associative CAM searching to check SHL hazard. Either case the searching occurs only when the input gets "hit" as a response from BF, so that reduces the number of CAM searches required for hazard checks. This filter could drastically reduce the bandwidth between LSQs.

At row 335, and similarly at rows 336 and 337, then associative searching for input LD is only performed when the BF's response is a hit indicating that there is a dependent ST instruction in the bank. The main roles of LSQ CAM search are to perform ST forwarding with the data of the matched dependent STs. There are two different match types in this LSQ: Full match 340 where the matched ST instruction contains whole data required for the input LD instruction. (e.g. Requested data by the LD is 8-byte and the stored data fully contains these 8 bytes); and a Partial match 342 where it is determined the matched ST instruction contains only a part of the data required for the input LD instruction (e.g., requested data by the LD is 8-byte and the stored data contains 4 bytes of that 8-byte data requested). Depending on the case, the LSQ proceeds with a different sequence of ST forwarding as follows:

For the Full match 340: In LSQ, the data of older ST value is forwarded to the requested LD data. Physically, the data of ST is copied to the corresponding RAM of LD data, and at 341 the LD can be served right away to the PPE since whole requested data is ready. In addition, if there are multiple matches for the LD instruction, the youngest one is always used for ST forwarding.

For the Partial match 342 at rows 336, 337: When partial matches happen, all the matches' data are sequentially associated to the load coalescing buffer (LCB) in LSQ at 345. The LCB coalesce the LD return data using different bytes from the matched ST instructions determined at 344. The details of the procedures and the structure of LCB as will be described in greater detail herein below.

In an example implementation, a latency of this process is t cycles, where t is the maximum number of bytes of one data, e.g., t=8 in one CGRA implementation. This operation can be processed while the normal LD/ST instruction installment is processing since the front-end operations of LSQ such as DPR, BF, and CAM search can be decoupled RAM memory and LCB access. No matter, the partial matches of LD request can merge for whole bytes of LD, the LSQ accesses L1D cache at 345 or L2 cache at 346 to fill the missing bytes of the data.

Otherwise, as shown in the Table of FIG. 7 in case of Bloom Filter misses, based on the cache hit/miss response, the LSQ provides the data from the L1 cache at 347 upon a cache hit, or at 348 sends out the L2D request after performing LD and ST miss handling operations. As in prior cache architectures, a miss status handling register for LD miss may be employed and ST merge buffer for ST miss to increase the effective bandwidth utilization between L2D and L1D.

With respect to a store (ST) execution (commit), ST instructions are served once all the memory instructions are installed into the LSQ bank. Since every iteration of a loop generate same number of LD and ST instructions, a ST execution process, or commit, is started by counting the number of LSIDs arrived to the LSQ. ST execution occurs in two phases: In a $1^{st}$ phase: Each incoming ST is buffered in the target LSQ and access the BF to check that there are dependent instructions in the LSQ. At the same time, the BFs in other LSQs also examine its dependency with in-flight LD instructions which are located in the LSQ bank at the moment. If BF tells that there are dependent LD instructions in the LSQ, then it performs CAM searches to confirm that there is a dependent in-flight LD instruction in the LSQ. Then a violation is reported to the ECU, which initiates recovery. The dependence predictor is also trained to prevent such violations in the future. In a $2^{nd}$ phase: when iteration becomes non-speculative, the second phase of ST execution begins. In this phase the oldest ST is removed from the LSQ, and the ST value is written out to the cache/memory system. If the ST hits in the cache, the corresponding cache line is marked as dirty. If the ST misses in the cache, the ST miss request is sent to the L2.

In one embodiment, there is implemented a write-through, write-no-allocate policy to minimize the number of commit stalls.

Referring back to FIG. 4, Bloom Filter 165 tracks all the in-flight memory instructions in the LSQ bank. Each filter 165 includes a Store Bloom filter and Load Bloom filters and are each managed separately. Each bloom filter entry consists of 1-bit to indicate a matching load/store.

Figure 9A:
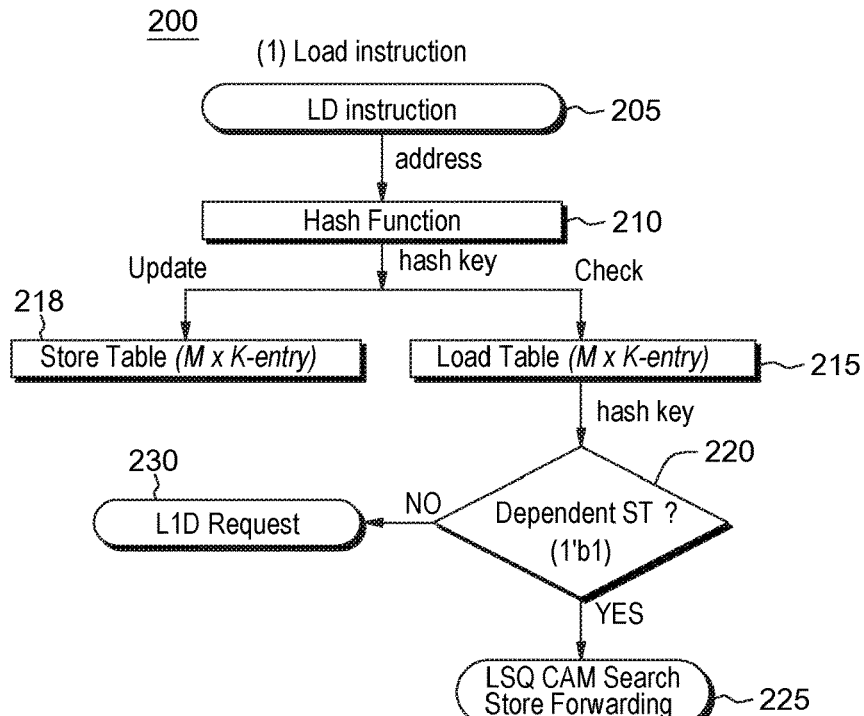
FIGS. 9A and 9B show respective Bloom Filter operation scenarios in each LSQ including associative searching reduction responsive to load (LD) instructions in FIG. 9A, and store (ST) instructions in FIG. 9B.
Figure 9B:
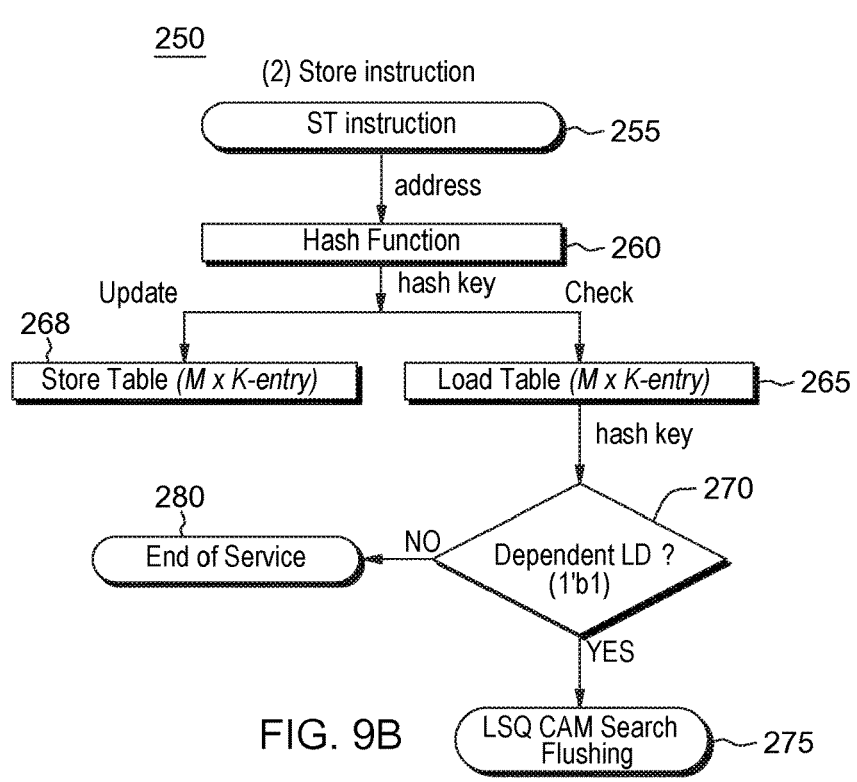

FIGS. 9A and 9B show respective Bloom Filter operation scenarios in each LSQ including associative searching reduction responsive to load (LD) instructions FIG. 9A and store (ST) instructions in FIG. 9B. Bloom Filter (BF) 165 is used to minimize search BW into each LSQ. The BF table has B=N*m (e.g. B=128 or 256) entries where N is the number of LSQ banks (iteration loops to be parallelized at once) and m is the capacity (number) of LD/ST entries. FIG. 9A and FIG. 9B show the BF as being logically viewed as two tables. The BF is physically a single table. Each LD or ST instruction coming into a particular LSQ bank comes with a hashed-value (to 1 of 128 entries). A hashing function is performed at the PPE itself to minimize critical path.

The BF runs two sequences to perform in-flight instruction dependency check: an Update sequence and an Evaluation sequence.

In the BF, an update sequence of each LD or ST, belonging to a specific iteration, gets installed in the LSQ and the BF table entry is set. In this sequence, LD/ST accesses a B-entry with its hash index.

For example, a method 200 of FIG. 9A shows a processing upon receipt of a load instruction 205. The load or store instruction received from the PPE includes an iteration number and an LSID that uniquely identify an age of the load operation and is used to store and identify the relationship to other loads and stores in flight at the same time. Using the bloom filter, for a store instruction, the given memory address is checked to ensure that there are no loads in later iterations that access the same memory address. If the address exists in such a bank, the store will forward the data to that load instruction at that bank.

In FIG. 9A, at 210, there is performed using the hash function to obtain from the incoming load instruction's data address 137 a hash key for indexing into the bloom filter to check for a potential matching dependent store. False negatives are not possible using a bloom filter. Only on a match in the bloom filter, a fully associative search of the LSQ bank is performed to find the matching load/store entry.

In one embodiment, in FIG. 9A at 218, once a check indicates that there are no prior store instructions to the same memory address, then for an update sequence of each LD belonging to a specific iteration, the B-entry is updated (i.e., the bit is set) to indicate that a memory address with this hash index has been seen for this iteration. The LD then gets installed in the LSQ.

For an evaluation sequence as shown in FIG. 9A of received current (and other) LD instruction, a process includes checking for a load-hit-store condition: the load instruction at 210 first triggers access to BF (logically shown as Store Table in FIG. 9A) of LSQ banks of older iterations and its own iteration. If the BF access returns a 1 in any of the BF associated with the older iterations or its own iteration, then an associative lookup 215 of the corresponding LSQ banks 162 of older iterations are performed. Processing includes checking the BF (logically the BF ST table entry) entry corresponding to its hash index—and if that 1-bit entry is a "1"—then it searches the specific LSQ bank to perform determining at 220 whether there is a dependent store instruction. If there is no dependent store instruction, then the request to the L1D cache 155 is triggered at 230. Otherwise, at 220, if there is a dependent store instruction, the LSQ cache associative memory is searched. That is, at 225 there is further triggered a data forwarding operation for the relevant bytes from the matching store instructions.

In one embodiment of a method 250 of FIG. 9B, responsive to receipt of a store instruction 255, there is performed at 260 using the hash function to obtain from the incoming store instruction's data address a hash key for indexing into the bloom filter to check for a potential matching dependent load.

First, at 268, for an update sequence of each ST belonging to a specific iteration, it gets installed in the LSQ and the ST accesses B-entry of the BF of all younger iterations and its own iteration (shown logically as accessing ST BF table in FIG. 9B) with its hash index.

For an evaluation sequence as shown in FIG. 9B of received current (and all other) ST instruction, a process includes checking for a store-hit-load condition: the store instruction at 260 triggers access to the load table of only the bloom filters of LSQ banks of younger iterations. This may include checking all prior iteration LDs for a SHL hazard condition by performing an associative lookup 265 of the LSQ banks 162 of younger iterations only on a bloom filter match in the corresponding LSQ bank. Processing includes checking the BF (logically shown as BF LD table entry in FIG. 9B) corresponding to its hash index—and if that 1-bit entry is a "1"—then it searches the specific LSQ bank to perform determining at 270 whether there is a dependent load instruction. If there is no dependent load instruction, then the service ends at 280. Otherwise, at 275, if there is a dependent load instruction, the LSQ cache associative memory is searched. That is, at 235 there is further triggered a flush operation for the iteration of the matching load instruction.

In one embodiment, each LSQ CAM bank can handle installing 2 LD/ST instructions into the LSQ (e.g., 2 W ports) for that iteration every cycle. In addition, LDs have to check prior iteration STs for LHS need. Each BF therefore gets many simultaneous requests (from multiple LSQs) For N banks (and assuming each bank gets 2 requests—say 1 LD and 1 ST), this means that there will be 2+(N−1) requests=N+1 BF checks need to be checked every cycle. BF table thus has 5 R+2 W ports so as to simultaneously check all of the above requests. Thus, the BF may reduce the search space from 5 (7) requests—to 1 or 2. The number of CAM ports in the LSQ then allow search. If more searches exist per cycle than the number of CAM ports, then the searches are serialized from the oldest iterations to the youngest (allowing older iterations to proceed ahead) and to prioritize SHL over LHS (also a form of iteration prioritizing).

In addition, the BF is integrated to each LSQ bank, may be further reset. When iteration is squashed or retired, whole BF data contents may be removed at once.

To support SMI and ILC operation in LSU, the LSQ architecture is iteration-partitioned. The state in the LSQ and the ST forwarding functionality of the LSQ which exploits the LCB structure 170 for LD data coalescing, is now described.

First, in the example CGRA architecture 10 of FIG. 1, there is allowed up to 4 iterations to be in-flight simultaneously and each iteration can have a maximum of 32 (or 64) memory instructions; therefore, a maximum of 128 (or 256) memory instructions in-flight. To accommodate the case when all the memory instructions in iteration reach a LSQ partition, the LSU is sized to hold 128 (or 256) memory instructions. The logical and physical organization of the LSQ 168 are illustrated in FIG. 5A.

When an instruction is installed to LSQ 168, the entry of the instruction is determined by the LSID as the CAM and RAM are organized with physically age-indexed structure. In one embodiment, the number of entries used in the bank for one iteration could be changed statically based on the number of memory instruction used in a loop. The RAM structure contains DATA of the ST instruction, and the LD's target PPE and output buffer address where to return the LD data.

Figure 5A:
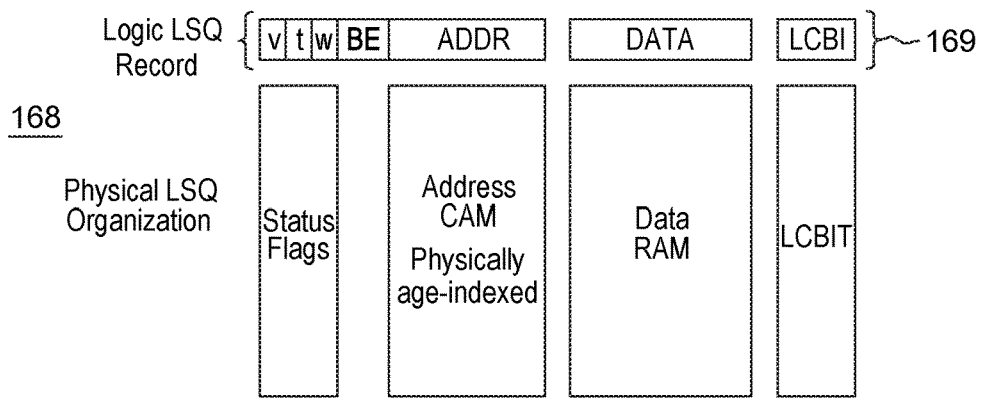
FIG. 5A shows the logical and physical organization of a LSQ in the LSU.

FIG. 5A shows each logical LSQ record 169 entered in the queue structure 168 including: a 1-bit VALID (v) bit field indicating whether this entry of LSQ is valid or not; a 1-bit TYPE (t) bit field indicating either a load, e.g., value of "1", or a store, e.g., a value of "0"; a 1-bit WAIT (w) bit field indicating a deferred operation, e.g., value of "1", or a non-deferred operation, e.g., value of "0"; a Byte Enable field (BE) which is 8-bit field indicating bytes which are valid among 8-bytes of data; a 64-bit ADDRSS field indicating the starting byte address of the memory instruction; a 64-bit DATA field indicating the LD/ST data, e.g., LD target address (e.g., PPE and output buffer address, or the store data (ST); and a load coalescing buffer (LCB) index field (LCBI) indicating in the LSQ entry the index for LCB per LD instruction where the coalesced data will be available.

In one embodiment, the LD may match an arbitrary number of STs and can get data forwarded from up to eight distinct STs because of different sized LDs/STs. To handle this case, the LCB 170 is implemented which is a specialized buffer that merges partial data of multiple ST instruction for one LD.

Figure 5B:
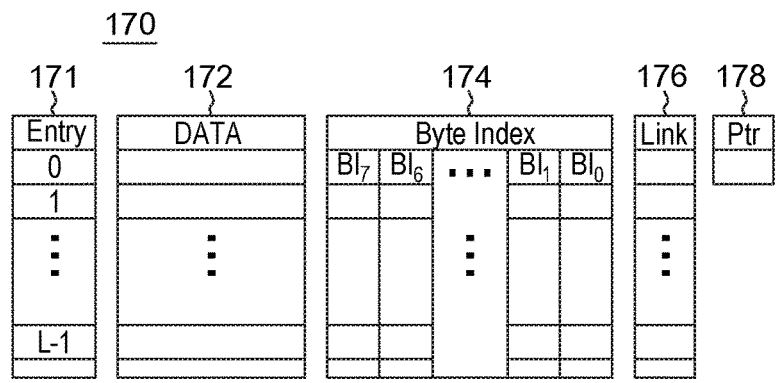
FIG. 5B depicts an example physical organization of a load coalescing buffer (LCB) of the LSU.

As shown in FIG. 5B, in one embodiment, the LCB is a linked list having two pointers that indicate the entry to be returned (head pointer) and the next entry to be allocated (tail pointer). When a load instruction requires coalescing data from partial matches, it collects bytes of data to the entry given by tail pointer. After merging all requested bytes, then the data in the entry indexed by head pointer is returned to processing element. An entry of LCB contains storage for 8-bytes (i.e. maximum data size of a LD). For each byte of the LD's data the LCB entry also tracks producer LSQ bank number and the producer LSID along with 1-bit to indicate if the data is coming from memory or form a forwarding ST.

FIG. 5B depicts an example physical organization of a load coalescing buffer 170 which is a common structure across the LSQ banks 162 that enable store forwarding to a load instruction by merging matched bytes of data from older store instructions and/or L1D cache. Each entry 171 of L-entry Load Coalescing Buffer consists of storage 172 for coalesced data (i.e., associated load return data). In one embodiment, each associated Load Return Data 172 corresponds to a one word size and includes coalesced data to be used for a load instruction determined to have more than one partial match with a previous store instruction(s); an associated byte index 174 including indices of each byte of the data (which includes an LSQ bank number or iteration ID) and LSID of the matched store instruction for each byte of matched data, and a bit that indicates whether the byte is sourced from memory or from a forwarding store; and a free pool pointer 178 (a head pointer pointing to an entry to be forwarded) of a linked list 176 pointing to the next available LCB entry (tail pointer) to be allocated.

When a load instruction's data request is found to be satisfied partially or fully by more than one older store instruction across one or more LSQ banks, an LCB entry is allocated to the load instruction.

Further, for each entry 171 there is associated a Byte Index (BI) 174 which is an index of the source for a byte. That is, the BI indicates the source store instructions for the coalesced bytes of data in the load instruction. In one embodiment, the LCB index 174 is written to the Log(L)-bit pointer field of the LSQ entry associated with the load instruction. Here, the BI may be a combination of log(N) bits which is a producer LSQ bank number for the corresponding byte of data and the LSID which is the ID of the Store instruction producing the corresponding byte of data. The BI will also contain a 1-bit indicator that informs that the data is coming from memory or from a forwarding store. The matched bytes of data are collected in the LCB entry and supplied to the load instruction after all the data has arrived.

In one embodiment, the Linked list of free pool pointers 176 and the header pointer 178 to the next free pool of Load Coalescing Buffer allocate available entry to a new load instruction, and free used entries after merging all the requested data and sending the merged data to the requested PPE. When the program starts, the linked list of free pool pointers is built and the header pointer is set to index the entry "0", which will be the first available entry for input load instructions. When a new load instruction needs an entry for coalescing data, the entry is released from the linked list of free pool pointers and the new header pointer is becomes the pointer value of the LCB entry pointed to by the current header pointer. Once an LCB entry is ready to be released after the data has been coalesced and supplied to the load instruction, the current head pointer is written to the free pool pointer field of this LCB entry and the new head pointer is set to the LCB entry being released.

Figure 12:
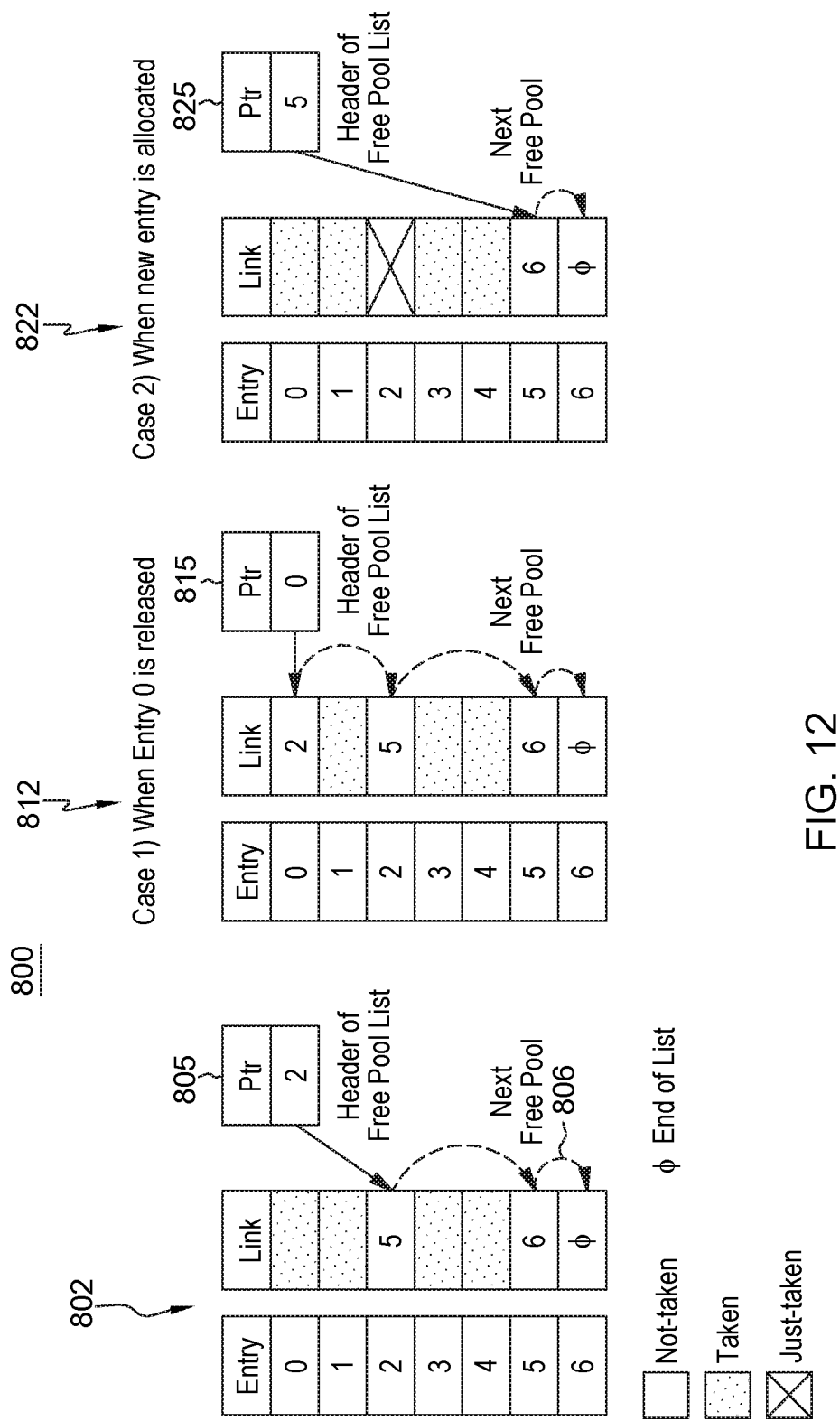
FIG. 12 show example operations 800 using a free pool list of the LCB.

FIG. 12 show example operations 800 using a free pool list. The operations 800 are depicted using a LCB 170 having an example of seven (7) entries, i.e., L=7. In one example, in an initial state 802 a pointer 805 points to entry 2 (an example header of a free pool list). Link values corresponding to entries 0-1 are already taken. The pointed link of entry 2 shows a corresponding link value corresponding to entry 5; entry 5 shows a corresponding link value of entry 6. The entry 6 shows a corresponding "end of list" value, e.g., 0, in the linked list—and corresponds to a next free pool pointer 806. In a further linked list state 812 corresponding to a first case 1), when the data at entry "0" is released, the header pointer 815 is updated to index "0" and the link pointer of entry "0" indexes the previous header entry of the list; in this example, the link entry value 2 is entered such that it points to the next entry of the linked list (at entry 2). Here, the link list value corresponding to entry 5 refers to a next free pool.

In a further linked list state 822 corresponding to a second case 2), when a new entry need to be allocated, the header of free pool list (e.g., at entry 5) is used for the input instruction, and the new header pointer 825 is set by the next free pool of the previous header, the entry "5".

The LSU 150 further provides mechanisms for failure and recovery. That is, in order to support iteration-level commit, flush and recovery of LSU are triggered while tracking of iteration completion or failure, and hence all sub-components of LSU supports iteration-level operations. In case of a failure, such as store-hit-load violation, misprediction and exceptions, the LSU supports efficient flush and recovery mechanism by iteration-level commit.

When flush is triggered, the LSU can select the LSQ banks of iterations to flush that contain wrong data or execute wrong sequences without tracking all instructions by instruction-level bookkeeping.

Once flush is triggered, the tables in Bloom Filter and CAM/RAM structures of LSQ in the flushed banks can be invalidated entirely.

The flushed iterations are to re-execute from scratch. In case of store-hit-load violation, since the violation updates the violation history table of dependence predictor, and hence the re-executed program can avoid same failure repeatedly.

Figure 11:
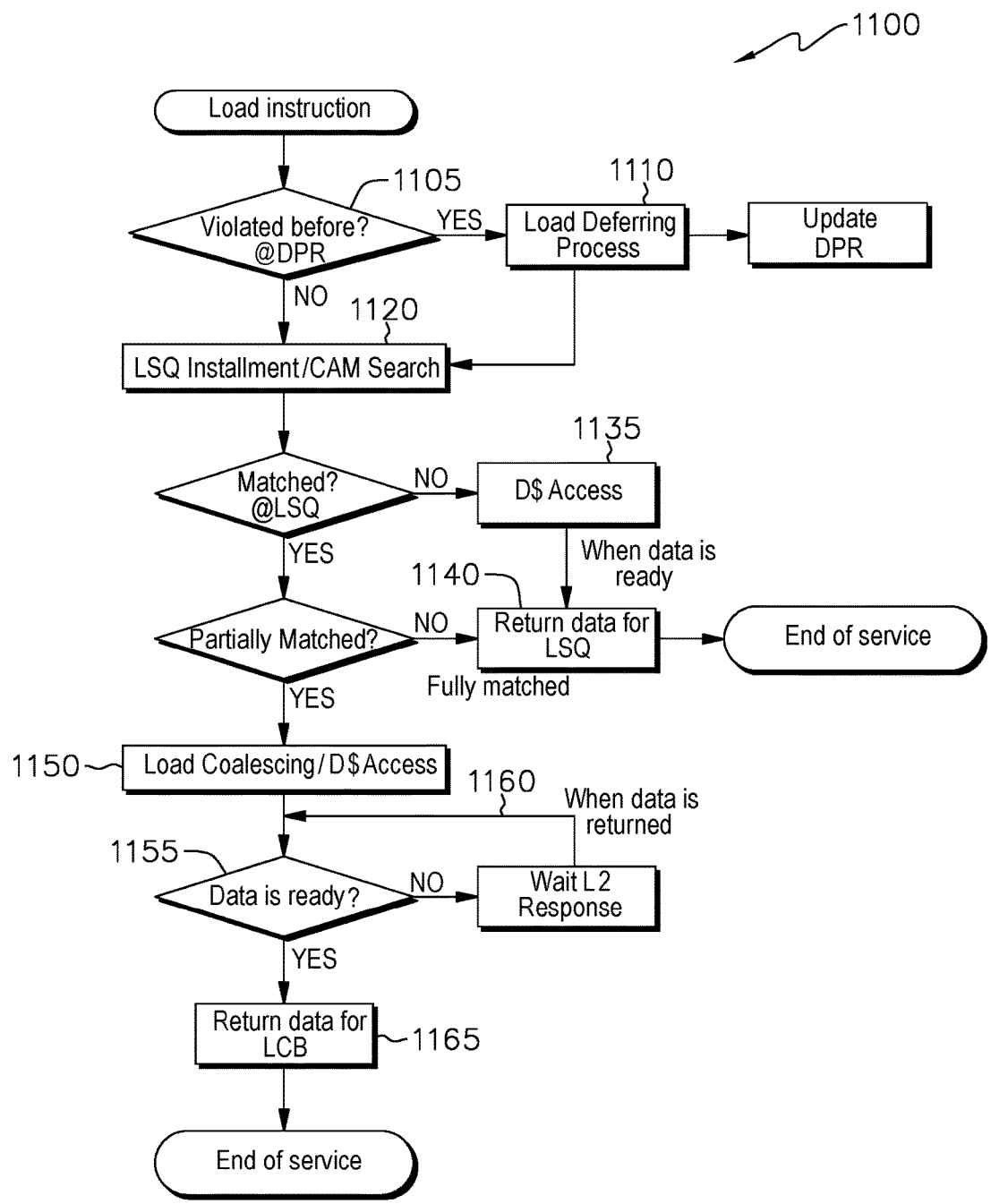
FIG. 11 depicts an operation sequence of the LSQ 168 and LCB 170.

FIG. 11 depicts an operation sequence 1100 of the LSQ 168 and LCB 170. If at 1105 the DPR predictor 158 indicates there is a violation history, then LSQ performs the load deferring process at 1110 and updates the DPR accordingly.

Otherwise, at 1105, if the DPR predictor 158 indicates there is no violation history, then the instruction is installed at the LSQ and a CAM search is performed at 1120 which returns matching results. If there is no match at the LSQ, then there is performed at 1135 accessing the Data cache (D$) and returning the results to the LSQ at 1140 when the data is ready. Otherwise, if there is a detected match at the LS Q, and if there is a full match, the full results are returned to the LSQ at 1140. If there is a LHS happening within any iteration where the CAM search results in more than one producer ST instruction, or partial producer ST instructions, an entry of LCB is allocated for the LD instruction at 1150. The LD's entry in the LSQ is updated with the index of LCB entry pairing the LD with a unique LCB entry.

In a Coalescing step, when partial data for LD arrives from memory at 1155, the LCB entry identifier in the LSQ for that LD is used to access the relevant LCB entry. At 1160, the data from memory returned will be all the 8 bytes being accessed by the LD. Using the information in the LCB about the partial producers, BI in FIG. 10, are, the relevant bytes of the data, is written to the data storage, DATA field in FIG. 10, associated with that LCB entry at 1165. Similarly when data arrives from multiple producer ST instructions, the relevant portions of data from each of the producing ST needs to be merged with the current contents of the LCB entry.

In one embodiment, when a LD is to be issued, it is important to know if the LCB is full. So a full bit needs to be set common across all the LSQ banks when the LCB occupancy exceeds threshold, i.e., a LD can be issued only of there are at least n-free entries in the LCB. Otherwise, if the LCB is full, then the LD instruction will be deferred until an entry of LCB is released (to be specified).

ECU/LSU

As mentioned, the ECU further communicates not only with the PEs but additionally with the LSU 150 to update the checkpointed state upon successful global commit of a loop iteration. The ECU 120 communicates with the LSU 150 across bus 145 to identify store-hit-load violations within and across iterations and run steps to squash all subsequent iterations beginning with the defaulting iteration, and to resume execution at the defaulting iteration. Finally, the ECU CGLR indicates to the PPEs and the LSU to resume execution from a previously checkpointed state (e.g., this is used when the process has been interrupted).

FIG. 5A shows following signals communicated between the ECU 120 and LSU 150 in conjunction with ILC and SMI functionality:

COMMIT REQ: 143 which is a signal communicated from the ECU 120 to the LSU 150. This signal is asserted to preserve program semantics and avoid corrupting memory, it is required that commits (copying data back to a memory location after processing), are timely, i.e., when a loop is being calculated, data is read and operated on and copied back to memory. However, a PPE can finish a younger iteration before finishing another parallel-implemented older iteration. Thus, the PPE can not commit back to memory (e.g., L1) data generated by the younger iteration as program semantics may not be preserved before an older commit and the memory may corrupt. Thus, loops (iterations) when finished must be committed in order, e.g., the oldest first, to keep memory correct. The COMMIT REQ 143 is sent by the PPE 10 to the LSU 150 when an iteration in flight completes.

Thus, given four example iterations in flight (e.g., multiple nested iterations are started in parallel, for four example iterations in-flight "n" and n+1, n+2 and n+3, the oldest iteration is "n" and the n+1, n+2 and n+3 are younger and speculative), it is possible that one or more PEs finish n+1, n+2 and n+3 iterations before iteration "n". The ECU 150 will not take any action with respect to this COMMIT operation. It waits for COMMIT REQ for iteration "n" to arrive, and will send out the commit request to LSU only when the iteration "n" (the oldest iteration in flight) is completed. That is, implicit in the signal to the LSU, is the assumption that the issued COMMIT REQ signal 143 is for the oldest iteration. In that case, the LSU 150 will responsively commit the data to the caches and memory.

COMMIT DONE signal 144 is the signal issued by the LSU 150 after performing a commit of data for the oldest iteration based on a received COMMIT REQ signal.

Thus, for example, when the ECU 120 receives the LCRINC signal from all the PPEs performing respective parallel operations in the oldest loop iteration, then this oldest iteration has completed, and now all stores for that iteration can now be committed. ECU generates A COMMIT REQUEST signal sent from ECU to the LSU. Getting this COMMIT REQUEST signal, the LSQ can commit all stores belonging to that iteration into the cache and/or memory. Once LSU finishes all commits into memory of cache, i.e., once all stores are pushed to the memory for a completed iteration, it sends the acknowledgement COMMIT DONE signal 144 to ECU).

Consequently, finishing the oldest iteration "n" a new iteration can be started, e.g., iteration n+4. Moreover, when n+4 iteration is started, the new oldest iteration becomes n+1, and iterations n+2, n+3 and n+4 are speculative. Iteration 4 replaces the iteration 0 (in a sense of rotating). This continues for all the iterations. A pointer, maintained by each PPE, for the oldest iteration moves in a circular manner.

EXCEPTION signal 147: In a further embodiment, the LSU 150 may further assert an exception signal to the ECU 120 indicating that something has gone wrong in the execution of a particular iteration. The EXCEPTION signal 147 informs for which iteration has encountered an exception.

EXCEPTION ITERATION ID signal 148 is, for example, a 2 bit signal asserted by the LSU 150 for indicating which iteration of the four iterations in-flight (e.g., iterations n, n+1, n+2 and n+3) has encountered an exception, or similarly, a 3-bit signal is asserted indicating which iteration of eight iterations in-flight has encountered an exception.

Thus, for an example exception occurring at n+2 iteration, upon receiving the EXCEPTION signal 147 and EXCEPTION ITERATION ID 148 for the n+2, depending upon the exception type, the action taken by the ECU 120 may include causing a delay in or re-execute iterations that are younger than n+2, i.e., delay or re-execute n+2 and n+3 iterations from the beginning with iterations n through n+1 continuing as they were. The ECU 120 may further discard data associated with the excepting iterations (e.g., n+2, n+3).

Thus, given iterations 0, 1, 2 and 3 in-flight: when an endpoint is reached for iteration 0, a commit request is sent out to the LSU and the LSU will commit all stores for the iteration 0 into the cache/memory. Then a COMMIT DONE is received by the ECU. The PPE will know that iteration 0 is finished and thus iteration 1 will become the oldest iteration and a new iteration 4 will be initiated. When iteration 1 is done, any new iteration launched will be iteration 5. This is repeated until all iterations for a program have been completed.

In one embodiment, the CGRA 100 is dynamic as the instructions change every cycle. The dynamism is useful when the number of instructions in a loop far exceeds the number of PPEs in a CGRA Block. In one embodiment, the dynamic CGRA (DCGRA) system 100 can be either static of dynamic issue mechanisms. In a static-issue (SISSUE) DCGRA, all PPEs in a CGRA Block fire off an instruction from a very-long instruction word at the same time, i.e., instruction issue is decided at compile time. Further, all PPEs transition from one VLIW word to another when they all have finished issuing instructions from the previous VLIW word. This is a lower performance than dynamic issue because loads from different PPEs in different VLIW words cannot be overlapped.

With respect to Dynamic Issue (DISSUE) DCGRA, every instruction in every PPE issues (in order) when its operands are ready independent of other PPEs. Thus, in one embodiment, instructions within each PPE are stored in an ordered list in an instruction-buffer (local to each PPE). Instructions are always issued in-order and happens when all of the input operands needed for the current instruction are ready. An instruction also needs a slot in the "output-buffer" when it's issued. If the output-buffer is full, no instruction is issued that cycle.

Although instructions are issued in order, they may fill out the output buffer out-of-order. This can happen when the next instruction has a latency that is at least 2 cycles less than the current instruction. Results from the output buffer can be "restrictively" consumed out-of-order. Specifically, if the outputs go to different destination PPEs, then the data can be consumed out of order. If outputs go to the same destination PPE, then the data has to be consumed in-order.

FIG. 18 illustrates a schematic of an example computer or processing system 11 that may implement or operate in conjunction with the GCRA 100 for accelerating iteration processing in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 18 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The system and methods herein may be incorporated within or used in conjunction with described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may operate in conjunction with the CGRA 100 that performs the methods described herein. The CGRA module 100 may be a separate integrated circuit, and/or programmed into the integrated circuits of the processor 12, with compiled program instructions loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
a plurality of processing element circuits (PEs), each processing element circuit (PE) employing hardware for executing program code instructions including a loop, each PE for running multiple concurrent iterations of the same loop, wherein a single PE selects and executes an instruction belonging to an oldest iteration of the same loop for which all data dependencies are satisfied, the instruction selecting being based on an iteration-age as well as a state of a data dependency;
a load and store unit (LSU) circuit including multiple banks of load store queues (LSQ banks) operatively coupled with said plurality of PEs for receiving and storing load instructions and store instructions associated with the multiple concurrent iterations issued by said PEs and enabling completion of iterations in order; and
an execution control unit (ECU) circuit operatively coupled with said plurality of PEs and said LSU circuit for issuing logic signals for synchronizing operations performed at said each PE and the LSU circuit, said issued logic signals including signals for tracking of the multiple concurrent iterations that have completed, which iterations are already running, and which iterations are yet to begin, the ECU circuit communicating said issued logic signals to and receiving signals from each PE and the LSU circuit to synchronize initiating and completing of said multiple concurrent iterations on all or a sub-set of the plurality of PEs, such that all instructions are committed at loop iteration boundaries, wherein to track iterations, said LSU circuit comprises:
a buffer circuit accessible by said multiple LSQ banks that enables store forwarding to a load instruction by collecting data for a load instruction upon determining multiple dependent store instructions across iterations and/or memory that contribute to the data requested by a load instruction; and wherein to track iterations;
a PE of said plurality of PEs issues an associated load (LD)/store (ST) identifier (LSID) for a respective issued LD instruction or ST instruction of an iteration received at the LSU circuit, each issued LD instruction or ST instruction stored in a dedicated storage slot in a given LSQ bank based on the LSID, said LSID for keeping track of the issued LD instruction or ST instruction; and
the PE of said plurality of PEs issues an associated iteration identifier (ID) field for each iteration of an in-flight instruction, said iteration ID used for ordering loads and stores within and across iterations; and
wherein said buffer circuit accessible by each LSQ bank of said multiple LSQ banks that enables store forwarding further comprises:
data storage entries for storing coalesced data;
index fields of each byte of the coalesced data, the index fields including an iteration ID and LSID of a matched store instruction for each byte of matched data, and a bit that indicates whether a byte is sourced from memory or from a forwarding store; and a linked list structure having a pointer pointing to a next available entry in said buffer circuit.

2. The apparatus of claim 1, wherein to track iterations, said LSU circuit further comprises:

a Bloom filter circuit associated with a respective LSQ bank of said multiple LSQ banks and receiving a LD instruction or ST instruction from a PE and for tracking all in-flight instructions and associated memory addresses in the respective LSQ bank, searching, for each memory address of an in-flight instruction, all elements of all load store queues in parallel, and determining a memory dependency of all in-flight memory instructions across different LSQ banks.

3. The apparatus of claim 2, wherein to track iterations, said LSU circuit further comprises:

an iteration-aware arbiter circuit receiving from said PE of said plurality of PEs an LSID associated with an issued LD instruction or ST instruction and configured to use said associated iteration ID to route LD instructions and ST instructions to an appropriate LSQ bank; and a dependence predictor circuit receiving an LSID associated with a received ST instruction and tracking a violation history of a received input instruction using said LSID associated with the received ST instruction, a violation history comprising a determination that a current input instruction is younger than a load or older than a load in program order, and determining whether a LD instruction should be deferred or not based on its violation history with a dependent ST instruction.

4. The apparatus of claim 2, wherein one of said multiple LSQ banks uses an in-flight instruction's memory address as a hash into the Bloom filter circuit to check for a matching dependent load/store instruction, and upon detecting a match in the Bloom filter circuit, said Bloom filter circuit searches a full LSQ bank associatively for a matching load/store instruction.

5. The apparatus of claim 4, wherein an LSQ bank further performs:

holding for all iterations in flight, all stores for any one iteration until an iteration endpoint is reached; and releasing loads/stores of an iteration from a corresponding LSQ bank only when all instructions of an iteration are complete.

6. The apparatus of claim 5, wherein an LSQ bank further:

detects, for a received load instruction, a collision with a store instruction at a same address;

checks all the stores of an LSQ bank of earlier iterations to ensure that there are no stores that go to the same address;

upon determining that no store belonging to an earlier iteration goes to the same address, commences the received load instruction; and upon determining that a store belonging to an earlier iteration goes to the same address, waits until the store at the same address and belonging to an earlier iteration has a correct data value written at the same address.

7. The apparatus of claim 5, wherein an LSQ bank further:

determines whether there are multiple stores at a same address of younger iterations, selects an iteration closest in time to a current load operation, and waits until a store writes to the same address.

8. The apparatus of claim 4, wherein an LSQ bank is configured to store load information and store information associated with a corresponding iteration level, each LSQ bank having an assigned said iteration ID, said LSU circuit further:

accessing, for a store instruction of a current iteration, a load table of only Bloom filter circuits of one or more of said multiple LSQ banks associated with younger iteration levels than said current iteration; and upon detecting a Bloom filter circuit match by associative lookup of the LSQ banks of said younger iteration levels, conducting a flush operation for an iteration of a matching load instruction.

9. A method for running multiple simultaneous instructions in a course grained reconfigurable architecture having a plurality of processing element circuits (PEs), the method comprising:

providing, at each processing element circuit (PE), hardware for executing program code instructions including a loop, each PE running multiple iterations of the same loop, a single PE selecting and executing an instruction belonging to an oldest iteration of the same loop for which all data dependencies are satisfied, the instruction selecting being based on an iteration-age as well as a state of a data dependency;

receiving and storing, at a load and store unit (LSU) circuit having multiple banks of load store queues (LSQ banks) operatively coupled with said plurality of PEs, load instructions and store instructions associated with the multiple iterations issued by said PEs and enabling completion of iterations in order; and issuing logic signals, at an execution control unit (ECU) circuit operatively coupled with said plurality of PEs and said LSU circuit, said issued logic signals for synchronizing operations performed at said each PE and the LSU circuit, said issued logic signals including signals for tracking of the multiple iterations that have completed, which iterations are already running, and which iterations are yet to begin, said synchronizing including communicating said issued logic signals from the ECU circuit to and receiving signals from each PE and the LSU circuit for initiating and completing of said multiple iterations on all or a sub-set of the plurality of PEs, such that all instructions are committed at loop iteration boundaries, wherein said tracking of multiple iterations that have completed, which iterations are already running, and which iterations are yet to begin by said LSU circuit comprises:

providing, at a buffer circuit accessible by said multiple LSQ banks, a store forwarding to a load instruction by collecting data for a load instruction upon determining multiple dependent store instructions across iterations and/or memory that contribute to the data requested by a load instruction;

issuing, by a PE of said plurality of PEs, an associated load (LD)/store (ST) identifier (LSID) for a respective issued LD instruction or ST instruction of an iteration received at the LSU circuit, each issued LD instruction or ST instruction stored in a dedicated storage slot in a given LSQ bank based on the LSID, said LSID for keeping track of the issued LD instruction or ST instruction; and issuing, by the PE of said plurality of PEs, an associated iteration identifier (ID) field for each iteration of an in-flight instruction, said iteration ID used for ordering loads and stores within and across iterations; and wherein said store forwarding at said buffer circuit accessible by each LSQ bank of said multiple LSQ banks further comprises:

storing, at data storage entries, coalesced data;
including, in index fields associated with each byte of the coalesced data, an iteration ID and LSID of a matched store instruction for each byte of matched data, and a bit that indicates whether a byte is sourced from memory or from a forwarding store; and
pointing, using a linked list structure, to a next available entry in said buffer circuit.

10. The method of claim 9, wherein said tracking of multiple iterations that have completed, which iterations are already running, and which iterations are yet to begin by said LSU circuit further comprises:
receiving, at said LSU circuit, a LD instruction or ST instruction issued from a PE, and tracking, using a Bloom filter circuit associated with a respective LSQ bank of said multiple LSQ banks, all in-flight instructions and associated memory addresses in the respective LSQ bank by searching, for each memory address of an in-flight instruction, all elements of all load store queues in parallel, and determining a memory dependency of all in-flight instructions across different LSQ banks.

11. The method of claim 10, wherein the tracking of multiple iterations that have completed, which iterations are already running, and which iterations are yet to begin further comprises:
configuring an iteration-aware arbiter circuit to receive from said PE of said plurality of PEs an LSID associated with a LD instruction or ST instruction and to use said associated iteration ID to route LD instructions and ST instructions to an appropriate LSQ bank; and
receiving, at a dependence predictor circuit, an LSID associated with a received ST instruction, and tracking, at the dependence predictor circuit, a violation history of a received input instruction using said LSID associated with the received ST instruction, a violation history comprising a determination that a current input instruction is younger than a load or older than a load in program order, and determining, at the dependence predictor circuit, whether a LD instruction should be deferred or not based on its violation history with a dependent ST instruction.

12. The method of claim 10, further comprising:
using an in-flight instruction's memory address as a hash into the Bloom filter circuit to check for a matching dependent load/store instruction, and
upon detecting a match in the Bloom filter, said Bloom filter circuit searching a full LSQ bank associatively for a matching load/store instruction.

13. The method of claim 12, further comprising:
holding, at an LSQ bank of said multiple LSQ banks, for all iterations in flight, all stores for any one iteration until an iteration endpoint is reached; and
releasing load/stores of an iteration from a corresponding LSQ bank only when all instructions of an iteration are complete.

14. The method of claim 13, further comprising:
detecting at said LSQ bank of said multiple LSQ banks, for a received load instruction, a collision with a store instruction at a same address;
checking all the stores of an LSQ bank of earlier iterations to ensure that there are no stores that go to the same address;
upon determining that no store belonging to an earlier iteration goes to the same address, commencing the received load instruction; and
upon determining that a store belonging to an earlier iteration goes to the same address, waiting until the store at the same address and belonging to an earlier iteration has a correct data value written at the same address.

15. The method of claim 13, further comprising:
determining, at said LSQ bank of said multiple LSQ banks, whether there are multiple stores at a same address of younger iterations,
selecting an iteration closest in time to a current load operation, and
waiting until a store writes to the same address.

16. The method of claim 12, wherein an LSQ bank is configured to store load information and store information associated with a corresponding iteration level, each LSQ bank having an assigned said iteration ID, said method further comprising:
accessing, for a store instruction of a current iteration, a load table of only Bloom filters of one or more of multiple LSQ banks associated with younger iteration levels than said current iteration; and
upon detecting a Bloom filter circuit match by associative lookup of the LSQ banks of younger iteration levels, conducting a flush operation for an iteration of a matching load instruction.

* * * * *